United States Patent
Pathan et al.

(10) Patent No.: US 9,951,703 B2
(45) Date of Patent: Apr. 24, 2018

(54) SYSTEMS AND METHOD FOR MULTI-CYLINDER MISFIRE DETECTION

(71) Applicant: General Electric Company, Schenectady, NY (US)

(72) Inventors: Habeeb Khan Pathan, Andhra Pradesh (IN); Paul Lloyd Flynn, Lawrence Park, PA (US); Pritamkumar Gangwal, Bangalore (IN); James Robert Schreiner, Erie, PA (US); Bhanuprakash Haranahalli Panchakshari, Bangalore (IN); Aninda Bhattacharya, Bangalore (IN); Ganesasubramanian Murugesan, Bangalore (IN); Milan Palinda Karunaratne, Anaheim, CA (US); Daniel Cullen, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/219,490

(22) Filed: Jul. 26, 2016

(65) Prior Publication Data
US 2016/0333807 A1 Nov. 17, 2016

Related U.S. Application Data

(63) Continuation-in-part of application No. 14/967,062, filed on Dec. 11, 2015.
(Continued)

(51) Int. Cl.
*F02D 41/00* (2006.01)
*F02D 41/26* (2006.01)
(Continued)

(52) U.S. Cl.
CPC ........... *F02D 41/008* (2013.01); *B61C 7/04* (2013.01); *B61C 17/00* (2013.01);
(Continued)

(58) Field of Classification Search
CPC ...... F02D 19/0623; F02D 29/06; F02D 41/00; F02D 41/008; F02D 41/0025;
(Continued)

(56) References Cited

U.S. PATENT DOCUMENTS

| | | | |
|---|---|---|---|
| 4,424,709 A | 1/1984 | Meier, Jr. et al. | |
| 5,303,158 A | 4/1994 | Kuroda | |

(Continued)

FOREIGN PATENT DOCUMENTS

| | | |
|---|---|---|
| EP | 1559898 A1 | 8/2005 |
| EP | 2843219 A1 | 3/2015 |

(Continued)

OTHER PUBLICATIONS

U.S. Appl. No. 14/967,062, filed Dec. 11, 2015, Paul Lloyd Flynn et al.

(Continued)

*Primary Examiner* — John Kwon
*Assistant Examiner* — Johnny H Hoang
(74) *Attorney, Agent, or Firm* — GE Global Patent Operation; John A. Kramer

(57) ABSTRACT

Various systems and methods are provided for identifying cylinder misfire. In one example, cylinder misfire may be identified based on a misfire monitor that differentiates a single-cylinder misfire event from a multi-cylinder misfire event based on output from a crankshaft speed sensor.

19 Claims, 17 Drawing Sheets

Related U.S. Application Data

(60) Provisional application No. 62/092,313, filed on Dec. 16, 2014.

(51) Int. Cl.

| | | |
|---|---|---|
| *F02D 41/30* | (2006.01) | |
| *B61C 7/04* | (2006.01) | |
| *B61C 17/00* | (2006.01) | |
| *F02D 41/14* | (2006.01) | |
| *F02D 19/06* | (2006.01) | |
| *G01M 15/11* | (2006.01) | |
| *F02D 29/06* | (2006.01) | |
| *B61C 5/00* | (2006.01) | |
| *F02D 41/28* | (2006.01) | |

(52) U.S. Cl.
CPC ......... *F02D 19/0623* (2013.01); *F02D 29/06* (2013.01); *F02D 41/0025* (2013.01); *F02D 41/0097* (2013.01); *F02D 41/1498* (2013.01); *G01M 15/11* (2013.01); *B61C 5/00* (2013.01); *F02D 2041/288* (2013.01); *F02D 2200/101* (2013.01); *F02D 2200/1015* (2013.01); *Y02T 10/36* (2013.01)

(58) Field of Classification Search
CPC ............. F02D 41/0097; F02D 41/1497; F02D 41/1498; F02D 41/3005; F02D 41/26; F02D 2200/101; F02D 2200/1015; F02D 2041/288; G01M 15/11; B61C 5/00; B61C 7/04; B61C 17/00; Y02T 10/36
USPC ............ 701/102–105, 110–114; 123/406.13, 123/406.18, 406.27, 406.33; 73/114.02, 73/114.27
See application file for complete search history.

(56) References Cited

U.S. PATENT DOCUMENTS

| | | | | |
|---|---|---|---|---|
| 5,499,536 A | * | 3/1996 | Wier | G01M 15/11 |
| | | | | 701/111 |
| 5,832,404 A | * | 11/1998 | Amano | G01M 15/11 |
| | | | | 123/436 |
| 5,862,507 A | | 1/1999 | Wu et al. | |
| 5,920,008 A | * | 7/1999 | Kishimoto | G01M 15/11 |
| | | | | 73/114.02 |
| 5,935,189 A | | 8/1999 | Park | |
| 6,285,947 B1 | * | 9/2001 | Divljakovic | G05B 23/0235 |
| | | | | 701/110 |
| 6,748,315 B2 | * | 6/2004 | Galtier | G01M 15/11 |
| | | | | 123/198 F |
| 8,256,278 B2 | | 9/2012 | Lee et al. | |
| 8,626,371 B2 | | 1/2014 | Kumar et al. | |
| 8,626,372 B2 | | 1/2014 | Kumar et al. | |
| 9,453,783 B2 | * | 9/2016 | Yu | G01M 15/11 |
| 2002/0146529 A1 | | 10/2002 | Lang et al. | |
| 2003/0225504 A1 | * | 12/2003 | Katayama | G01M 15/11 |
| | | | | 701/110 |
| 2006/0101902 A1 | | 5/2006 | Christensen | |
| 2006/0225700 A1 | * | 10/2006 | Ramappan | F01L 1/3442 |
| | | | | 123/406.21 |
| 2007/0261484 A1 | * | 11/2007 | Nishigaki | G01M 15/11 |
| | | | | 73/114.04 |
| 2008/0189023 A1 | * | 8/2008 | Lewis | G01M 15/11 |
| | | | | 701/102 |
| 2009/0088956 A1 | * | 4/2009 | Lin | B60Q 9/00 |
| | | | | 701/111 |
| 2010/0005651 A1 | | 1/2010 | Levante et al. | |
| 2010/0043746 A1 | | 2/2010 | Hartmann et al. | |
| 2010/0071448 A1 | * | 3/2010 | Akimoto | B60K 6/365 |
| | | | | 73/114.04 |
| 2010/0288035 A1 | * | 11/2010 | Arakawa | G01M 15/11 |
| | | | | 73/114.03 |
| 2011/0106405 A1 | * | 5/2011 | Dulzo | F01L 1/18 |
| | | | | 701/103 |
| 2011/0265560 A1 | * | 11/2011 | Lee | G01M 15/11 |
| | | | | 73/114.04 |
| 2013/0073174 A1 | | 3/2013 | Worden et al. | |
| 2013/0312504 A1 | * | 11/2013 | Bowman | F02D 41/0097 |
| | | | | 73/114.05 |
| 2014/0074380 A1 | | 3/2014 | Fisher et al. | |
| 2014/0257674 A1 | | 9/2014 | Assaf et al. | |
| 2014/0352659 A1 | * | 12/2014 | Glugla | F02D 41/0082 |
| | | | | 123/350 |

FOREIGN PATENT DOCUMENTS

| | | |
|---|---|---|
| GB | 2260194 A1 | 4/1993 |
| JP | 2001-098999 A | 4/2001 |
| JP | 2007071191 A | 3/2007 |
| WO | 8400417 A1 | 2/1984 |
| WO | 1984000417 A1 | 2/1984 |
| WO | 2010005651 A2 | 1/2010 |
| WO | 2013039733 A1 | 3/2013 |
| WO | 2013161008 A1 | 10/2013 |

OTHER PUBLICATIONS

Australian Examination Report issued in connection with related AU Application No. 2015268726 dated Aug. 22, 2016.

Notification of Reasons for Refusal issued in connection with corresponding JP Application No. 2015-240694 dated May 16, 2017.

* cited by examiner

SYSTEMS AND METHOD FOR MULTI-CYLINDER MISFIRE DETECTION

CROSS REFERENCE TO RELATED APPLICATIONS

This application is a continuation-in-part of U.S. patent application Ser. No. 14/967,062, entitled, "MULTI-FUEL ENGINE SYSTEM," filed Dec. 11, 2015, which claims priority to U.S. Patent Application No. 62/092,313, entitled, "MULTI-FUEL ENGINE SYSTEM," filed Dec. 16, 2014, each of which is hereby incorporated in its entirety herein by reference for all purposes.

FIELD

Embodiments of the subject matter disclosed herein relate to an engine, engine components, and an engine system, for example.

BACKGROUND

Cylinder misfire monitors may be used to detect cylinder misfire caused by fueling errors or other types of cylinder degradation. Typically, such misfire detection assumes that only one cylinder of the engine is misfiring in a given engine cycle.

BRIEF DESCRIPTION

In one embodiment, a system includes an engine having a plurality of cylinders coupled to a crankshaft, a crankshaft speed sensor, and a controller. The controller may be configured to receive output from the crankshaft speed sensor (e.g., the controller may be configured to sample an output signal of the crankshaft speed sensor), differentiate a single-cylinder misfire event from a multi-cylinder misfire event based on the output from the crankshaft speed sensor, and adjust one or more engine operating parameters responsive to an indication of a single-cylinder misfire event differently from a multi-cylinder misfire event.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
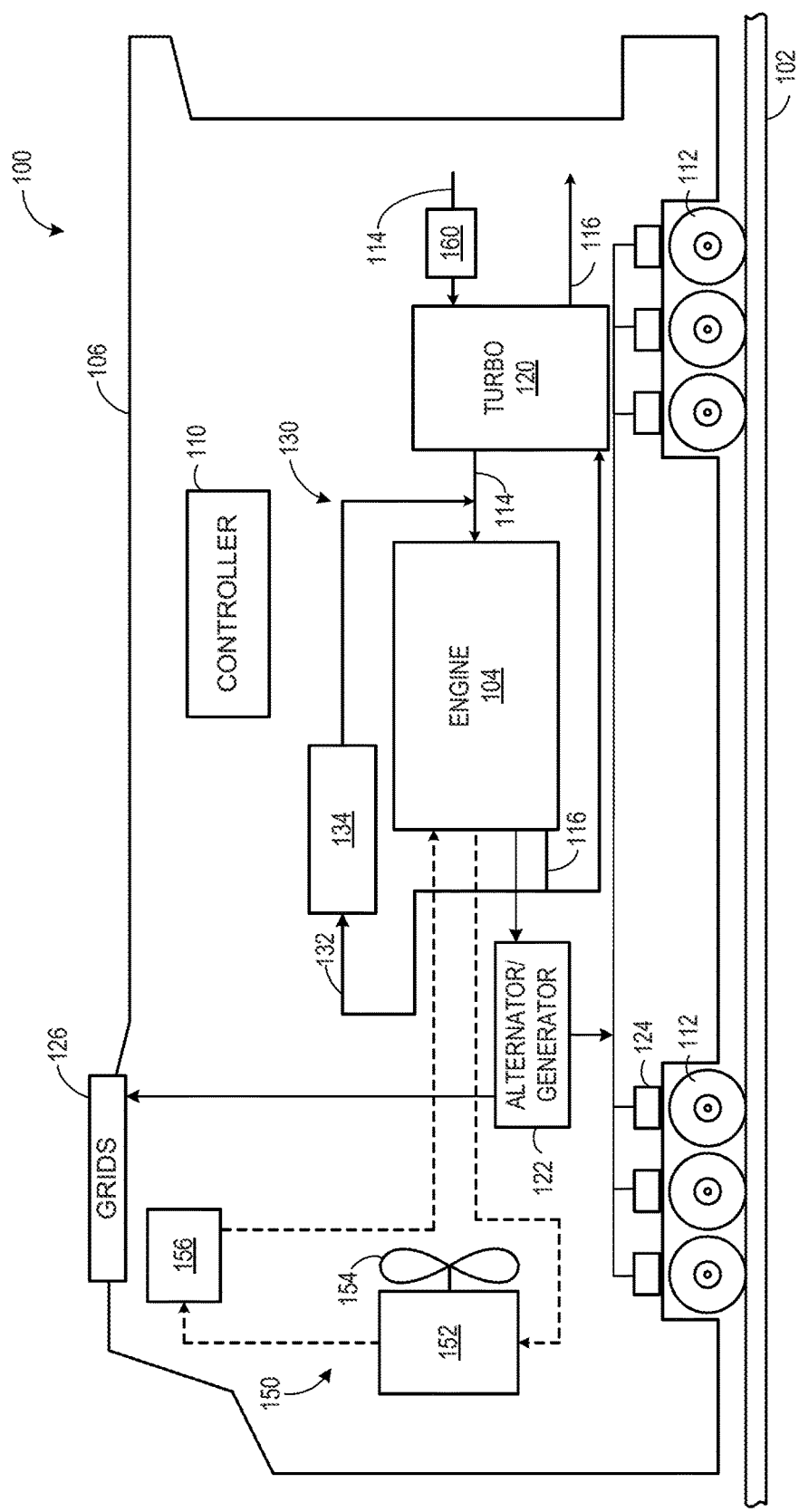
FIG. 1 shows a schematic diagram of an embodiment of a vehicle with an engine.

The following description relates to various embodiments of detecting cylinder misfire in an engine having a plurality of cylinders coupled to a crankshaft. The speed of the crankshaft may be detected by a crankshaft speed sensor and the output from the crankshaft speed sensor may be used to differentiate a single-cylinder misfire event from a multi-cylinder misfire event. Responsive to an indication of cylinder misfire, one or more engine operating parameters may be adjusted. Responsive to an indication of a single-cylinder misfire event, the operating parameters may be adjusted differently from when a multi-cylinder misfire event is detected. In this way, appropriate actions may be taken to mitigate misfire occurring in only one cylinder vs. multiple cylinders, thus reducing persistent misfire, increasing fuel economy, and improving emissions.

The following description also relates to various embodiments of tuning each liquid fuel injector of an engine in order to enable operation at a highest-possible ratio of gaseous fuel to liquid fuel (also referred to as a substitution ratio) for each cylinder of the engine. The tuning of each liquid fuel injector may be based on detection of misfire in each cylinder during the tuning process. Misfire in each cylinder may be detected using a misfire monitor that detects torsional oscillations using signals from a crankshaft sensor, for example.

As explained above, it may be challenging to control the combustion of a multi-fuel engine at high gaseous fuel utilization (e.g., low liquid fuel usage) because liquid fuel injectors may have a non-linear delivery characteristic. As the liquid fuel delivery is ramped down to allow higher gaseous fuel usage, a standard liquid fuel injector may suddenly reduce its flow at about 15% maximum injection rate, referred to as the turn down point. Each injector in a multi-cylinder engine may have its own turn down point. If the injectors are all treated equally, the total gaseous fuel usage will be determined by the injector that turns off at the highest fuel delivery quantity. As such, if the injectors have a turn down point that range from 5% to 15%, the engine may be limited to a substitution ratio of 85% (e.g., 85% gaseous fuel, 15% liquid fuel).

According to embodiments disclosed herein, a misfire monitor may be initiated that detects poor combustion in individual cylinders as the liquid fuel injection quantity is reduced, and then tunes the lowest possible liquid fuel injection rate for each cylinder individually to provide stable combustion in each cylinder. The multi-fuel engine may be designed to run at very high gaseous fuel substitution ratio, such as 99% gaseous fuel and 1% liquid fuel by energy content. During the tuning process, the engine may start combusting all liquid fuel and then add gaseous fuel to a safe level for all cylinders, such as 80% gaseous fuel. The combustion roughness will be measured by the misfire monitor. In some examples, the misfire monitor may be a torsional vibration order monitor in the controller that monitors one or more torsional vibration orders, such as the half-order. When all cylinders are firing evenly, the half-order level will be low. The liquid fuel injection quantity of each cylinder will be reduced until its misfire is detected by the half-order monitor. Then the liquid fuel injection quantity will be increased to gain proper combustion of that cylinder. This process will be repeated on each cylinder to tune the entire engine to the lowest safe level of liquid fuel usage. The stability of combustion will be monitored by the half-order detection system, and if any cylinder starts to misfire, the liquid fuel injection rate can be increased on that individual cylinder.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Before further discussion of the approach for providing tuning liquid fuel injections in a multi-fuel engine, an example of a platform is disclosed in which an engine may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104, which supported by a chassis (i.e., a support structure such as indicated generally by reference numeral 106). In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 receives ambient air from an air filter 160 that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may additionally combust fuel including gasoline, kerosene, natural gas, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel and/or natural gas engine that generates a torque output that is transmitted to the generator 122 which is mechanically coupled to the engine 104. In one embodiment herein, engine 104 is a multi-fuel engine operating with diesel fuel and natural gas, but in other examples engine 104 may use various combinations of fuels other than diesel and natural gas, such as only diesel fuel.

The generator 122 produces electrical power that may be stored and applied for subsequent propagation to a variety of downstream electrical components. As an example, the generator 122 may be electrically coupled to a plurality of traction motors 124 and the generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel set. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

In some embodiments, the vehicle system 100 may include a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system (illustrated in FIG. 3 as aftertreatment device 314) coupled in the exhaust passage upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 may further include an exhaust gas recirculation (EGR) system 130 coupled to the engine 104, which routes exhaust gas from an exhaust passage 116 of the engine 104 to the intake passage 114 downstream of the turbocharger 120. In some embodiments, the exhaust gas recirculation system 130 may be coupled exclusively to a group of one or more donor cylinders of the engine (also referred to a donor cylinder system). As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by a controller 110 (having, e.g., one or more processors), or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller, such as controller 110. Coolant which is cooled by the radiator 152 enters a tank 156. The coolant may then be pumped by a water, or coolant, pump (not shown) back to the engine 104 or to another component of the vehicle system, such as the EGR cooler.

The rail vehicle 106 further includes an engine controller 110 (referred to hereafter as the controller) to control various components related to the rail vehicle 106. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of rail vehicle operation.

The controller 110 may receive information from a plurality of sensors and may send control signals to a plurality of actuators. The controller 110, while overseeing control and management of the rail vehicle 106, may be configured to receive signals from a variety of engine sensors, as further elaborated herein, in order to determine operating parameters and operating conditions, and correspondingly adjust various engine actuators to control operation of the rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature (such as from sensors 320 and 322 of FIG. 3, described below), particulate filter temperature, particulate filter back pressure, engine coolant pressure, gas temperature in the EGR cooler, exhaust soot quantity (from soot/particulate matter sensor), or the like. Correspondingly, the controller 110 may control the rail vehicle 106 by sending commands to various components such as the traction motors 124, the alternator/generator 122, cylinder valves, fuel injectors, a notch throttle, or the like. Other actuators may be coupled to various locations in the rail vehicle.

Figure 2:
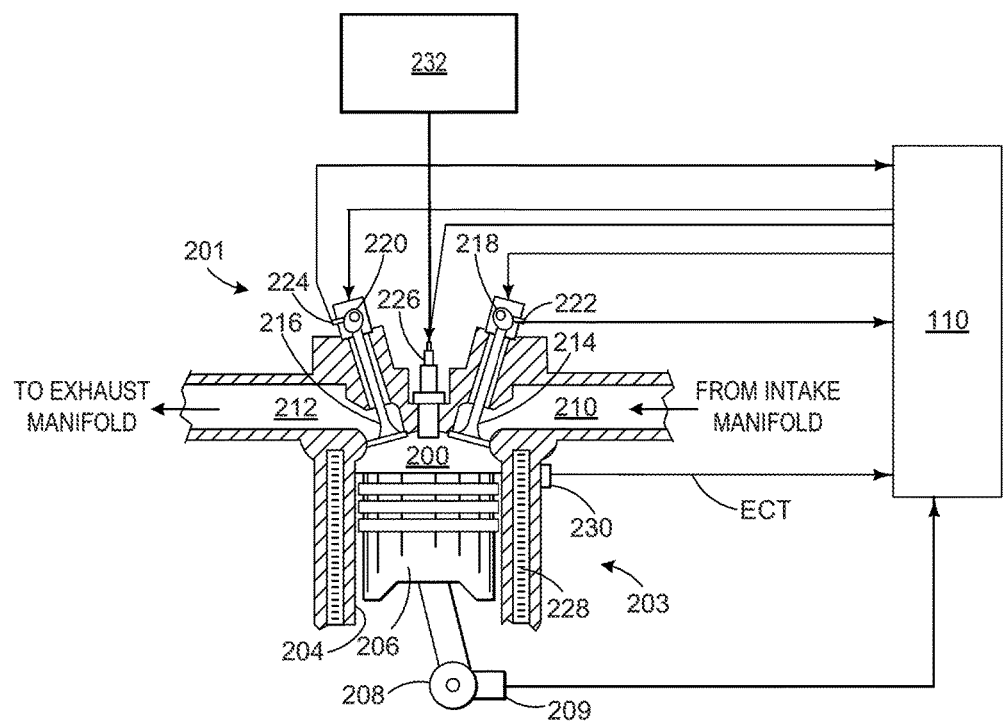
FIG. 2 shows a schematic diagram of a cylinder of the engine of FIG. 1.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and fuel injector, described below, and a cylinder block 203. In some examples, each cylinder of the multi-cylinder engine may include a separate cylinder head coupled to a common cylinder block.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed from crankshaft speed sensor 209, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. In one example, crankshaft speed sensor may be a Hall effect sensor, variable reluctance sensor, or linear variable differential transducer configured to determine crankshaft speed based on the speed of one or more teeth on a wheel of the crankshaft. Correspondingly, the controller 110 may control the vehicle system by sending commands to various components such as alternator, cylinder valves, throttle, fuel injectors, etc.

The cylinder (i.e., combustion chamber) 200 may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake runner 210. The intake runner 210 receives intake air via an intake manifold. The intake runner 210 may communicate with other cylinders of the engine in addition to the cylinder 200, for example, or the intake runner 210 may communicate exclusively with the cylinder 200.

Exhaust gas resulting from combustion in the engine is supplied to an exhaust including an exhaust runner 212. Exhaust gas flows through the exhaust runner 212, to a turbocharger in some embodiments (not shown in FIG. 2) and to atmosphere, via an exhaust manifold. The exhaust runner 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank 232, fuel pumps, and a fuel rail (not shown). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). Further, as explained in more detail below, each cylinder of the engine may be configured to receive gaseous fuel (e.g., natural gas) alternative to or in addition to diesel fuel. The gaseous fuel may be provided to cylinder 200 via the intake manifold, as explained below, or other suitable delivery mechanism.

Figure 3:
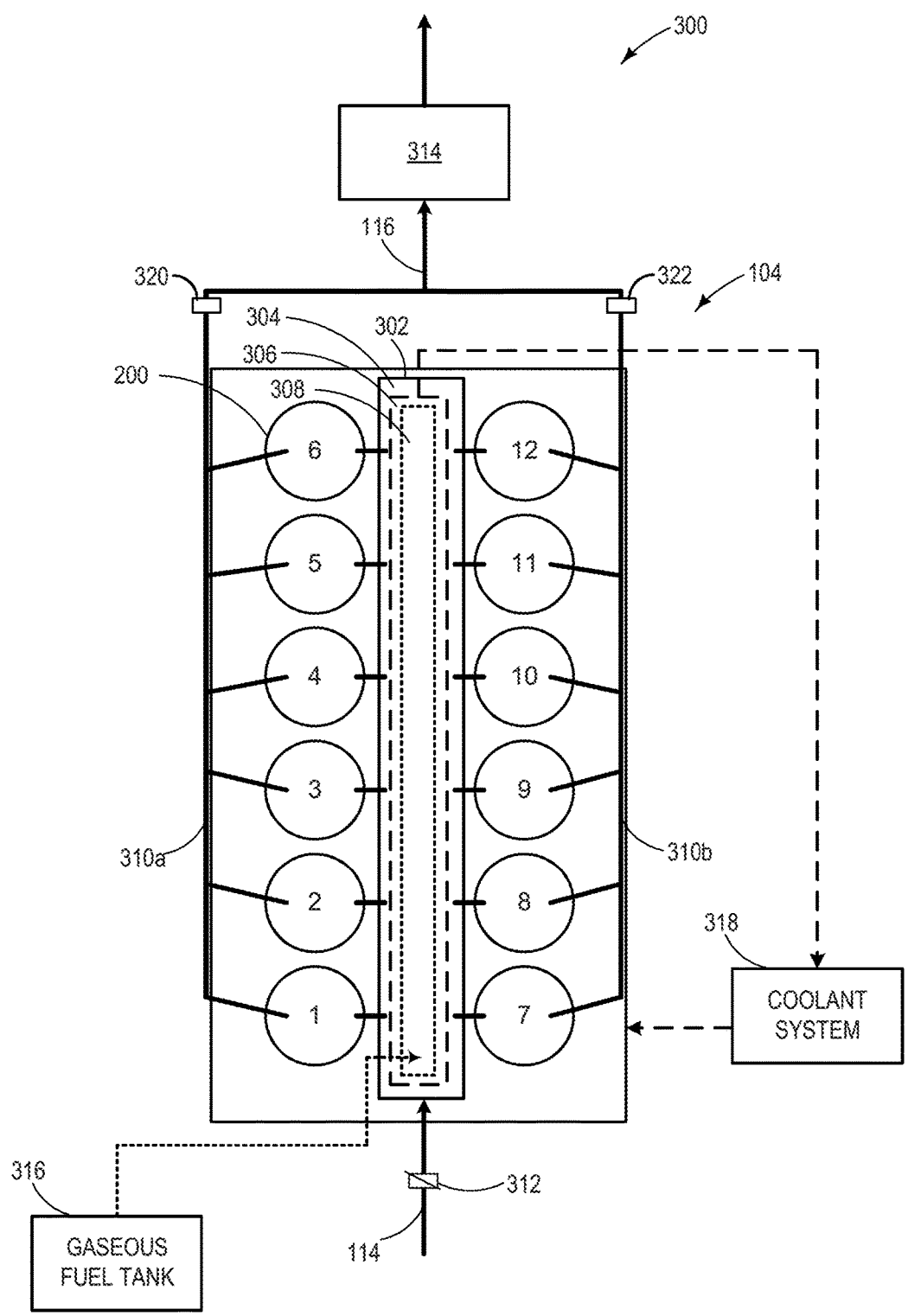
FIG. 3 shows a schematic diagram of an engine system including the engine of FIG. 1.

FIG. 3 shows a schematic diagram of an engine system 300 including multi-cylinder engine 104 having a plurality of cylinders 200. Thus, the engine system 300 includes the engine 104 described above with respect to FIG. 1. The engine 104 receives intake air for combustion from intake manifold 302. Intake manifold 302 receives intake air from intake passage 114, which receives ambient air from an air filter (shown in FIG. 1) that filters air from outside of a vehicle in which the engine 104 may be positioned. The flow of intake air into intake manifold 302 may be controlled by throttle 312, the position of which may be controlled by controller 110.

In the embodiment depicted in FIG. 3, the engine 104 is a V-12 engine having twelve cylinders. In other examples, the engine may be a V-6, V-8, V-10, V-16, I-4, I-6, I-8, opposed 4, or another engine type. Due to the vee configuration of the engine, the engine includes a first cylinder bank having six cylinders (e.g., cylinders 1-6) and a second cylinder bank having six cylinders (e.g., cylinders 7-12). Intake manifold 302 is arranged between the two cylinder banks and is configured to supply intake air to each cylinder of each bank via a plurality of intake runners. While not shown in FIG. 3, each intake runner is coupled to a separate cylinder head that at least partially defines a cylinder. Thus, intake air that flows through the intake manifold is distributed to a plurality of intake runners, each fluidically coupled to a separate cylinder head of the engine.

Intake manifold 302 is configured to supply intake air to the cylinders of the engine, as described above. However, in some examples, intake manifold 302 includes further passageways for draining coolant from the engine and delivering gaseous fuel to the engine. As such, intake manifold 302 includes a first passage 304 configured to flow intake air. First passage 304 is coupled to the plurality of intake runners. First passage 304 receives intake air from intake passage 114.

To drain coolant from the engine, intake manifold 302 may include a second passage 306. Second passage 306 receives coolant that is directed out of each cylinder head, for example, and the second passage directs the coolant back to the general engine coolant system 318. The engine coolant system 318 may include one or more coolant components, such as a radiator (e.g., radiator 152 of FIG. 1), coolant tank (e.g., tank 156), cooling lines, pumps and/or other components. Thus, coolant from the engine coolant system is pumped to the engine 104, where it flows through one or more jackets of the cylinder block and/or cylinder head (e.g., coolant sleeve 228) to cool the engine. The coolant then drains out of the engine via drainage lines leading out from each cylinder head to the second passage 306, and the coolant is returned to the engine coolant system.

In some modes of operation, engine 104 may operate with both liquid fuel combustion (e.g., diesel fuel) and gaseous fuel (e.g., natural gas) combustion. While liquid fuel is delivered to each cylinder according to the configuration described above with respect to FIG. 2, gaseous fuel may be delivered to each cylinder via a third passage 308 of the intake manifold 302. As shown in FIG. 3, the third passage 308 of the intake manifold 302 may receive a supply of gaseous fuel from a gaseous fuel tank 316, via one or more gaseous fuel lines, pumps, pressure regulators, etc. In some embodiments, gaseous fuel tank 316 may be located remotely from engine 104, such as on a different rail car (e.g., on a fuel tender car), and the gaseous fuel may be supplied to the engine 104 via one or more fuel lines that traverse the separate cars. However, in other embodiments gaseous fuel tank 316 may be located on the same vehicle as engine 104. The third passage 308 may include a plurality of gas admission valves, each configured to supply gaseous fuel from the third passage 308 to a respective cylinder head. However, in some examples, the third passage, gas admission valves, and gaseous fuel tank may be dispensed with and the engine may only operate with liquid fuel (e.g., diesel).

Exhaust gas resulting from combustion in the engine 104 is supplied to an exhaust passage 116, where the exhaust is treated by aftertreatment device 314 and/or flows through one or more turbochargers before exiting to atmosphere. In the configuration illustrated in FIG. 3, each cylinder bank has an exhaust manifold. For example, exhaust manifolds 310a and 310b are illustrated in FIG. 3. Each exhaust manifold receives exhaust released from each cylinder of a respective cylinder bank (via an exhaust runner of the respective cylinder head, such as exhaust runner 212 of FIG. 2). Each exhaust manifold 310a, 310b directs exhaust to the common exhaust passage 116. Further, each exhaust manifold may include a respective temperature sensor. As shown, exhaust manifold 310a includes temperature sensor 320 and exhaust manifold 310b includes temperature sensor 322. Temperature sensors 320 and 322 may send signals representative of exhaust temperature to the controller (e.g., controller 110).

Thus, the engine systems described above provide for a plurality of cylinders, each cylinder including a liquid fuel injector configured to inject a liquid fuel (e.g., diesel). Further, each cylinder is configured to receive gaseous fuel (e.g., natural gas). A gaseous fuel-air mix in a cylinder may be combusted via injection of liquid fuel from a liquid fuel injector. The engine may be configured to operate over a wide range of gaseous fuel and liquid fuel amounts, referred to herein as a substitution ratio. For example, under some conditions it may be desirable to operate the engine with a substitution ratio of zero, wherein all combustion energy is derived from liquid fuel combustion. Under other conditions, it may be desirable to operate the engine with a substitution ratio of greater than zero, wherein at least some of the combustion energy is derived from gaseous fuel.

Figure 8:
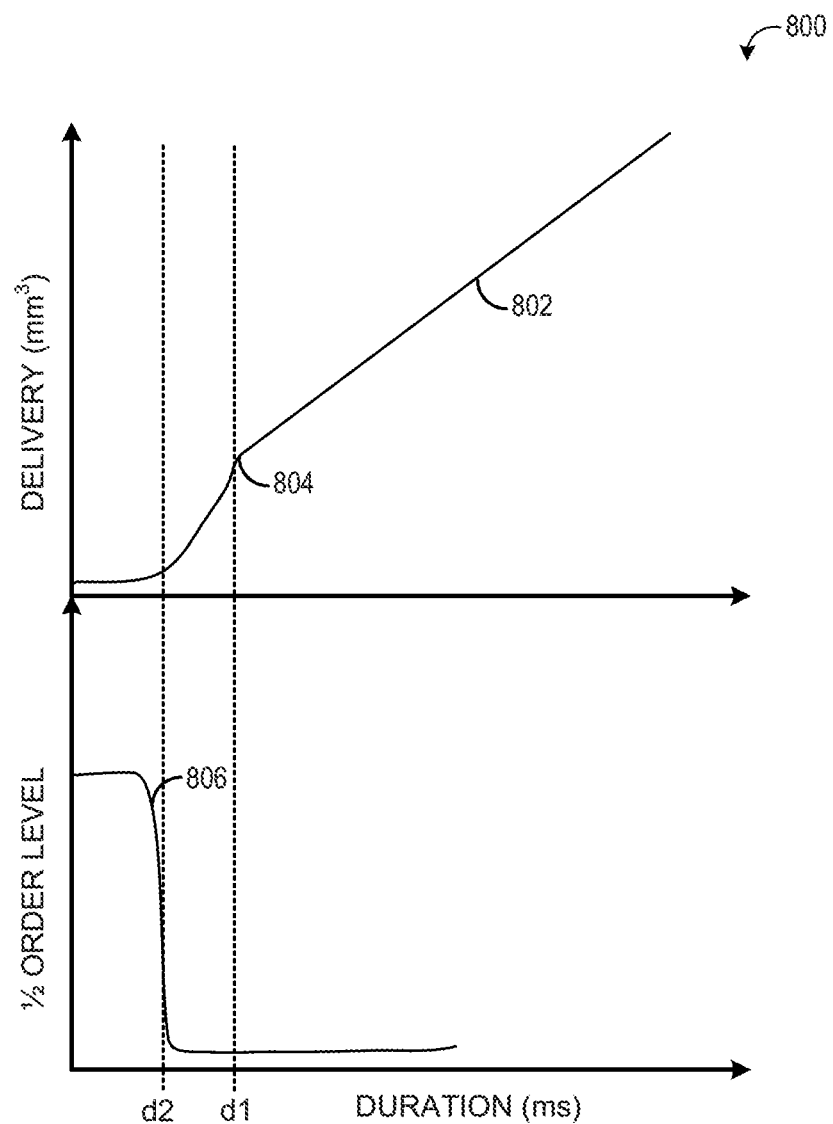
FIGS. 8-9 illustrate examples of injector delivery curves.

As explained above, in some conditions it may be desirable to operate the engine with a substation ratio of nearly 100%. As the combustion of the gaseous fuel relies on the presence of at least some liquid fuel, even during operation with high substitution ratios, the liquid fuel injectors may still be operated to provide some liquid fuel to each cylinder. However, each liquid fuel injector may have a minimum liquid fuel injection quantity, referred to as the turn down point, below which the injection quantity is not linearly correlated with the duration at which the injector is open (also referred to as the open duration). FIG. 8 is a diagram 800 illustrating an example injector delivery curve 802 for a liquid fuel injector, showing that above a first injector open duration d1 (where duration is plotted on the horizontal axis), the fuel injection amount (e.g., volume, plotted on the vertical axis) increases linearly with increasing duration. However, below this point, referred to as the turn down point 804, the fuel delivery quantity may not change linearly with changing duration, e.g., the quantity may decrease at a greater rate than the duration. As shown by combustion curve 806, at a second duration d2 below the turn down point, stable combustion may cease and misfire may occur, due to the small amount of liquid fuel injected. The misfire may be detected based on ½ order frequency component level as determined by a ½ order misfire monitor, explained below.

Figure 9:
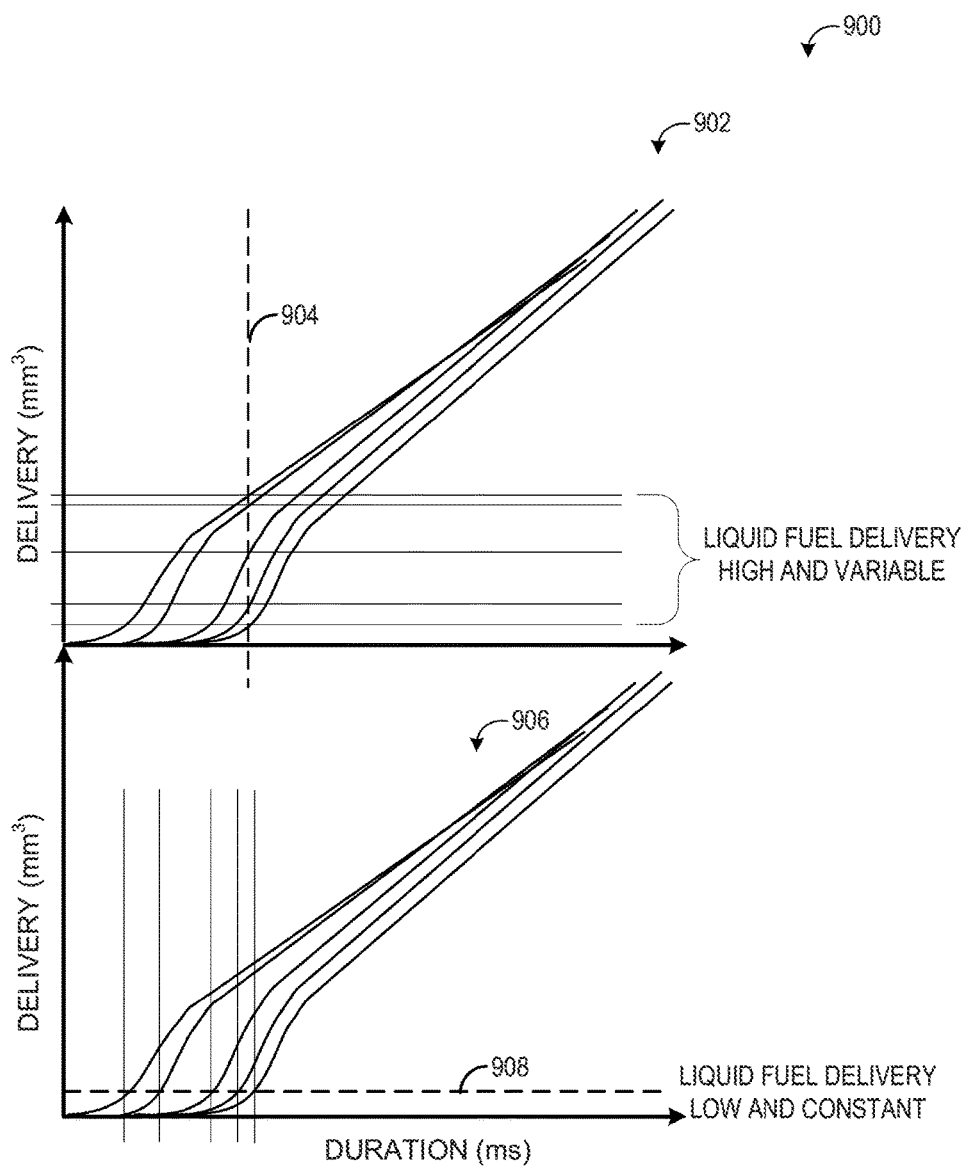

The turn down point of each individual injector may vary. For example, FIG. 9 is a diagram 900 showing a plurality of injector delivery curves 902 for a plurality of liquid fuel injectors. As illustrated by the plurality of injector delivery curves 902, for a given set of injectors, the turn down points may vary considerably. To ensure combustion stability, each fuel injector may typically be operated based on the highest turn down point of all the cylinders, or based on the highest duration of injector opening that ensures stable combustion. As shown by curves 902, if each injector is operated at the same duration (such as the duration needed to produce stable combustion in the injector with the highest turn down point, represented in FIG. 9 by line 904), a highly variable quantity of liquid fuel will be delivered among injectors. Such operation may lower the amount of gaseous fuel the engine can operate with. For example, the injector with the lowest turn down point may be operated at a duration much higher than the lowest duration needed to sustain combustion for that cylinder.

As will be described in more detail below, the lowest duration each injector can be operated at and still maintain combustion stability may be determined during a tuning routine. The fuel delivery quantity of each injector may be based on the duration that each is injector is open. As such, the fuel quantity and open duration may each be referred to when describing the tuning routine. For simplicity in description, the open duration will be used for the remainder of the description.

The tuning routine may include serially ramping down the open duration for each injector and monitoring for misfire. Once misfire is detected, the open duration of the injector of the misfiring cylinder may be ramped up until misfire ceases. That open duration may then be set as the lowest open duration that injector is capable of safely operating at. When very high levels of gaseous fuel are requested (e.g., 99%), that injector may then be operated at its tuned lowest open duration. This process may be repeated for each cylinder individually. As a result, when very high levels of gaseous fuel are requested (e.g., 99% gaseous fuel), each injector may be operated at a different duration, resulting in the same liquid fuel quantity delivered. This is illustrated by the plurality of injector delivery curves 906 of FIG. 9, where each injector is operated at a different duration resulting in the same fuel delivery volume 908.

Figure 4:
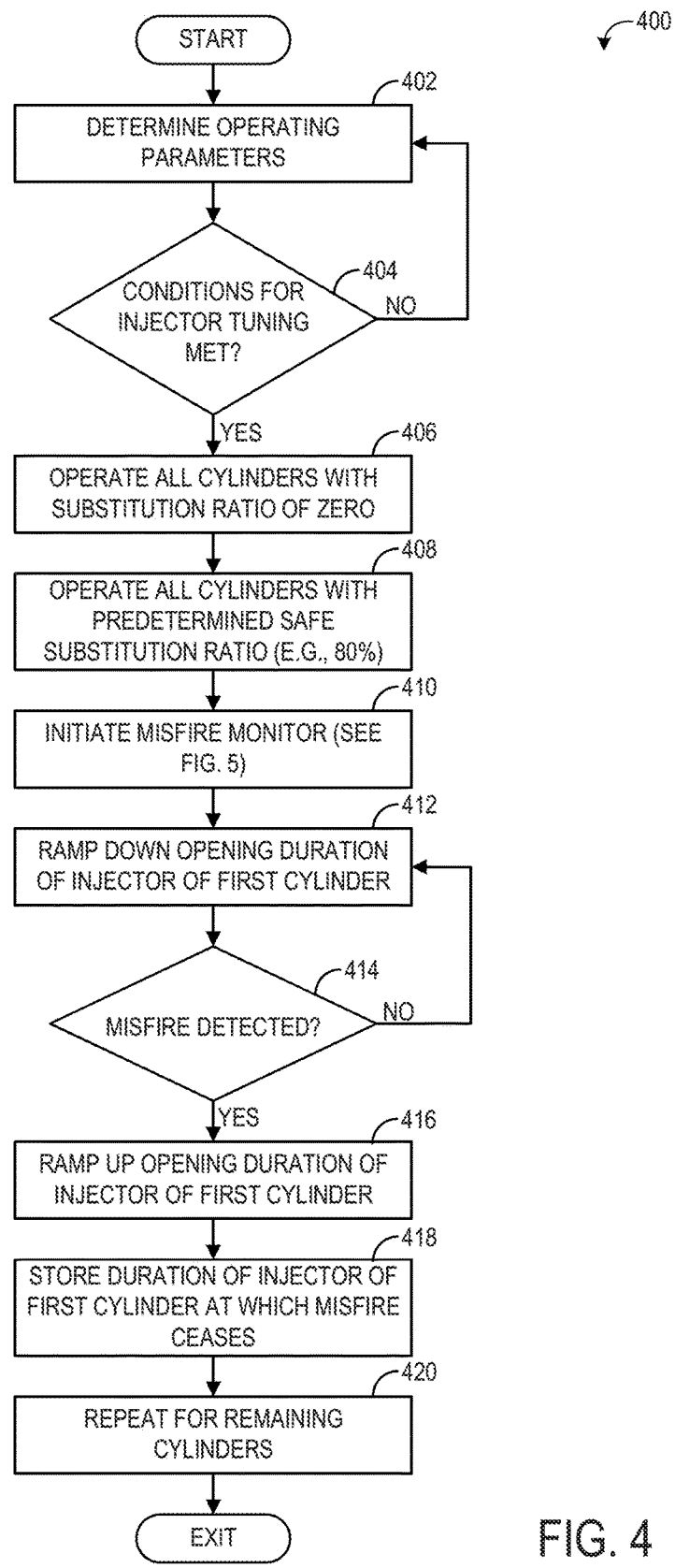
FIG. 4 is a high level flow chart illustrating a method for tuning a plurality of cylinders.

Turning now to FIG. 4, a method 400 for tuning a plurality of liquid fuel injectors of an engine (such as engine 104 of FIGS. 1-3) is illustrated. Method 400 may be carried out by a controller, such as controller 110 of FIGS. 1-3, according to non-transitory instructions stored thereon. At 402, method 400 includes determining engine operating parameters. The determined operating parameters may include, but are not limited to, engine speed, engine torque demand, engine temperature, and other operating parameters. At 404, method 400 includes determining if conditions for performing the injector tuning are met. The conditions for performing the injector tuning may include the tuning routine having not been performed prior (e.g., during the first operating period after manufacture of the engine, or following maintenance), or a threshold duration (of time, engine cycles, vehicle distance traveled, etc.) having lapsed since a prior tuning routine was performed.

The tuning routine entry conditions may also include operating conditions that permit a high level of gaseous fuel usage (e.g., near 100%). Engines configured to operate with both liquid and gaseous fuel may be operated with as much gaseous fuel as possible while still maintaining requested engine power. For example, in standard liquid-fueled engines, such as diesel engines, 100% of produced engine power may be derived from combustion of diesel fuel. In multi-fuel engines, a portion of the engine power may be derived from gaseous fuel while the remaining engine power may be derived from liquid fuel. For example, as much as 99% of produced engine power may be derived from combustion of gaseous fuel, with the remaining 1% of power derived from the combustion of diesel fuel. The amount of gaseous fuel "substituted" for the liquid fuel may be referred to as a substitution ratio. The substitution ratio may reflect the portion of engine power derived from gaseous fuel. For example, a substitution ratio of 80 indicates 80% of the power is derived from gaseous fuel, while a substitution ratio of 50 indicates 50% of the power is derived from gaseous fuel. A substitution ratio of 0 indicates liquid-only operation.

The substitution ratio may be set based on engine temperature, desired fuel type, notch throttle position, relative fuel levels in each fuel tank (e.g., if the level of gaseous fuel is below a threshold, more liquid fuel may be used), vehicle location (e.g., whether the vehicle is in a tunnel), and/or other parameters. Thus, the entry conditions may include engine temperature, throttle position, vehicle location, etc., each being in a range that allows for operation at high gaseous fuel utilization (e.g., 99%).

If the entry conditions have not been met, method 400 continues to monitor operating conditions at 402. If the conditions have been met, method 400 proceeds to 406 to operate all cylinders of the engine with a substitution ratio of zero (e.g., no gaseous fuel utilization). Then, at 408, all cylinders are operated at a predetermined safe substitution ratio, such as 80. The predetermined safe substitution ratio may include a level of gaseous fuel utilization that is known to produce stable (e.g., no misfires) combustion.

At 410, a misfire monitor is initiated to monitor for cylinder misfire. The misfire monitor will be described in more detail below with respect to FIG. 5. Briefly, the misfire monitor may detect misfire in one or more cylinders based on half-order or higher torsional oscillations produced by the engine and measured by a crankshaft speed sensor.

At 412, method 400 includes ramping down the open duration of the injector of a first cylinder of the engine. The open duration may be continuously ramped down, or ramped down in a step-wise manner, at a suitable rate. During the ramping down of the duration that the injector is open, the misfire monitor will be operating in order to determine if misfire occurs in the first cylinder, which may indicate that the liquid fuel injection quantity has dropped to a level that does not sustain combustion.

Thus, at 414, method 400 includes determining if misfire in the first cylinder is detected. If no misfire is detected, method 400 loops back to 412 to continue to ramp down the open duration of the injector. If misfire is detected, method 400 proceeds to 416 to ramp up the open duration of the injector of the first cylinder. The open duration of the injector may be ramped up until the misfire monitor ceases to detect misfire in the first cylinder. At 418, the open duration of the injector of the first cylinder at which misfire ceases is stored, and at 420, the tuning process is repeated for the remaining cylinders (e.g., the open duration of an injector of a second cylinder is ramped down while the substitution ratio of the remaining cylinders is held steady at the predetermined safe level, the misfire monitor indicates when misfire is detected in the second cylinder, the open duration of the injector of the second cylinder is ramped up until misfire ceases, and the duration at which misfire ceases is stored for the injector of the second cylinder).

After the tuning routine has been carried out on all injectors of all cylinders, when operating conditions permit engine operation with nearly only gaseous fuel (e.g., only enough liquid fuel to sustain combustion), each injector will be operated with an open duration determined by the tuning routine. In some examples, this may include each injector delivering the same quantity of liquid fuel. The misfire monitor may continue to operate in order to detect if misfire occurs in any of the cylinders. If misfire is detected, the open duration of the injector of the misfiring cylinder may be increased to stop the misfire. In some examples, the stored minimum open duration for that injector may be adjusted if future misfire is identified for that cylinder.

The tuning routine described above determines the minimum duration each injection may be opened during a fuel injection event and still sustain combustion while operating at a given set of parameters (e.g., an engine speed and load point where high gaseous fuel utilization is permitted). However, when the engine is operating at other engine speed and load points, misfire may result if the liquid fuel injectors are operated at the minimum open durations determined above. Thus, the tuning process described above may be performed for a variety of speed and load points, and the minimum injector open duration for each injector at each speed and load point may be determined. In this way, each cylinder may have an individual misfire limit determined for each engine operating point. This misfire limit may be above the absolute minimum amount of time each injector is capable of being opened for in some conditions, while in other conditions the misfire limit may be at or below the minimum amount of time each injector is capable of being opened for. After the tuning routine has been carried out for each speed and load point, when the engine enters a given speed and load range, the minimum liquid fuel injector open duration for that speed and load range may be identified for each injector, and each cylinder may be operated at a substitution ratio that provides a maximum possible gaseous fuel amount while meeting the desired power output and minimum liquid injector open duration.

Figure 5:
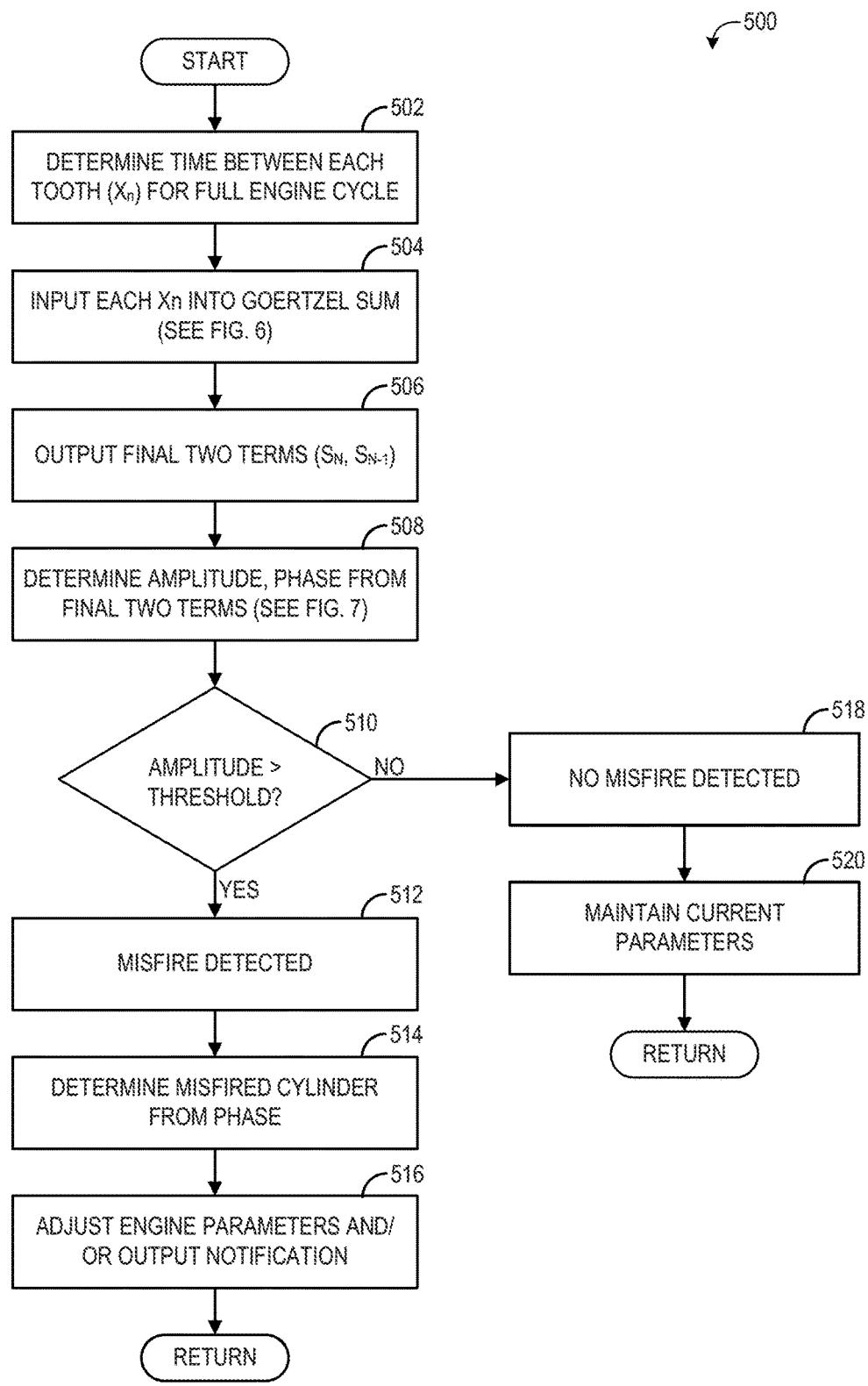
FIGS. 5-7 are flow charts illustrating a method for running a misfire monitor.

As explained above, a misfire monitor may be used in the tuning routine to detect misfiring cylinders. The misfire monitor may also be run during other engine operating events, and in some examples may be run during all engine operating events. FIG. 5 is a flow chart illustrating a method 500 for running a misfire monitor. Method 500 may be carried out a control unit, such as controller 110, according to non-transitory instructions stored thereon. In some examples, controller 110 may include multiple nodes, have a hierarchical organization, be capable of performing multi-threaded processing, and/or other configuration that may allow a portion of method 500 may be carried out by a first level of the controller, while another portion of method 500 may be carried out by a second, different level of the controller. Additional details about the multi-level process will be described below. Method 500 may detect half-order or higher torsion vibrations, alone or in combination. In one example, method 500 may only detect half-order torsional vibrations, for example when the engine is a four-stroke engine. In other examples, method 500 may detect first order torsional vibrations, for example when the engine is a two-stroke engine. Detection of other torsional vibration orders are within the scope of this disclosure.

At 502, method 500 includes determining an amount of time ($X_n$) between the passing of each tooth of a crankshaft wheel past a crankshaft sensor for a full engine cycle (e.g., two revolutions of the crankshaft). In one example, the crankshaft wheel may include a plurality of teeth, and the amount of time between when a first tooth and a second, adjacent tooth passes by the crankshaft sensor may be determined for each tooth of the wheel. In one example, the wheel may include 90 teeth, and thus approximately 180 $X_n$ samples may be collected in an engine cycle.

At 504, each value of $X_n$ is input into a recursive sum algorithm, such as a Goertzel sum. Additional details regarding the Goertzel sum is described below with respect to FIG. 6. Briefly, the Goertzel sum calculates a term ($S_n$) for each $X_n$ that is based on a previous two $X_n$ terms and a calibratable coefficient. At 506, the final two terms of the Goertzel sum, $S_N$ and $S_{N-1}$, are output and passed on to a model at 508, where they are used to determine an amplitude and phase. Additional details regarding this model are presented below with respect to FIG. 7. Briefly, the plurality of $X_n$ samples collected during the engine cycle represent a signal that may be processed to determine the amplitude and phase of the signal. Based on the amplitude, it may be determined if misfire is present, and if misfire is present, the phase of the signal may be used to determine which cylinder is misfiring.

Thus, at 510, method 500 includes determining if the amplitude is greater than a threshold amplitude. The threshold amplitude may be a suitable amplitude, such as an amplitude predetermined when no cylinders are misfiring. If the amplitude is greater than the threshold, method 500 proceeds to 512 to indicate that misfire is detected. At 514, method 500 optionally includes determining which cylinder misfired based on the phase of the signal calculated above. At 516, one or more engine operating parameters may be adjusted and/or a notification of the misfire may be output. For example, in response to detected misfire, a liquid fuel injection quantity may be increased, fuel injection timing may be adjusted, or other parameter may be adjusted. Further, the output notification may include notifying an operator of the vehicle in which the engine is installed via an indicator light, for example, or setting a diagnostic code. Method 500 then returns.

If the amplitude is not greater than the threshold at 510, method 500 proceeds to 518 to indicate that no misfire is detected and maintain current operating parameters at 520. Method 500 then returns.

Thus, method 500 monitors for cylinder misfire by analyzing torsional oscillations of the crankshaft created by the combusting cylinders. During operation with no misfire, the torsional oscillations are relatively low. However, if a cylinder is misfiring and thus not contributing to the torque of the crankshaft, higher order torsional oscillations may increase. These may be detected based on output from the crankshaft speed sensor.

As described above, the misfire monitor includes two portions, a first portion where the Goertzel sum is calculated on the collected crankshaft sensor output in order to output two terms, which are fed into the second portion of the misfire monitor, where the two terms are used to calculate a phase and amplitude to detect misfire and the cylinder in which the misfire is occurring. Each portion of the monitor may be performed on a different level of logic in the controller. For example, the first portion may be performed on a lower level and the second portion may be performed on a higher level. This may include performing the two portions on different nodes, or performing them in different threads of a multi-thread processor.

Figure 6:
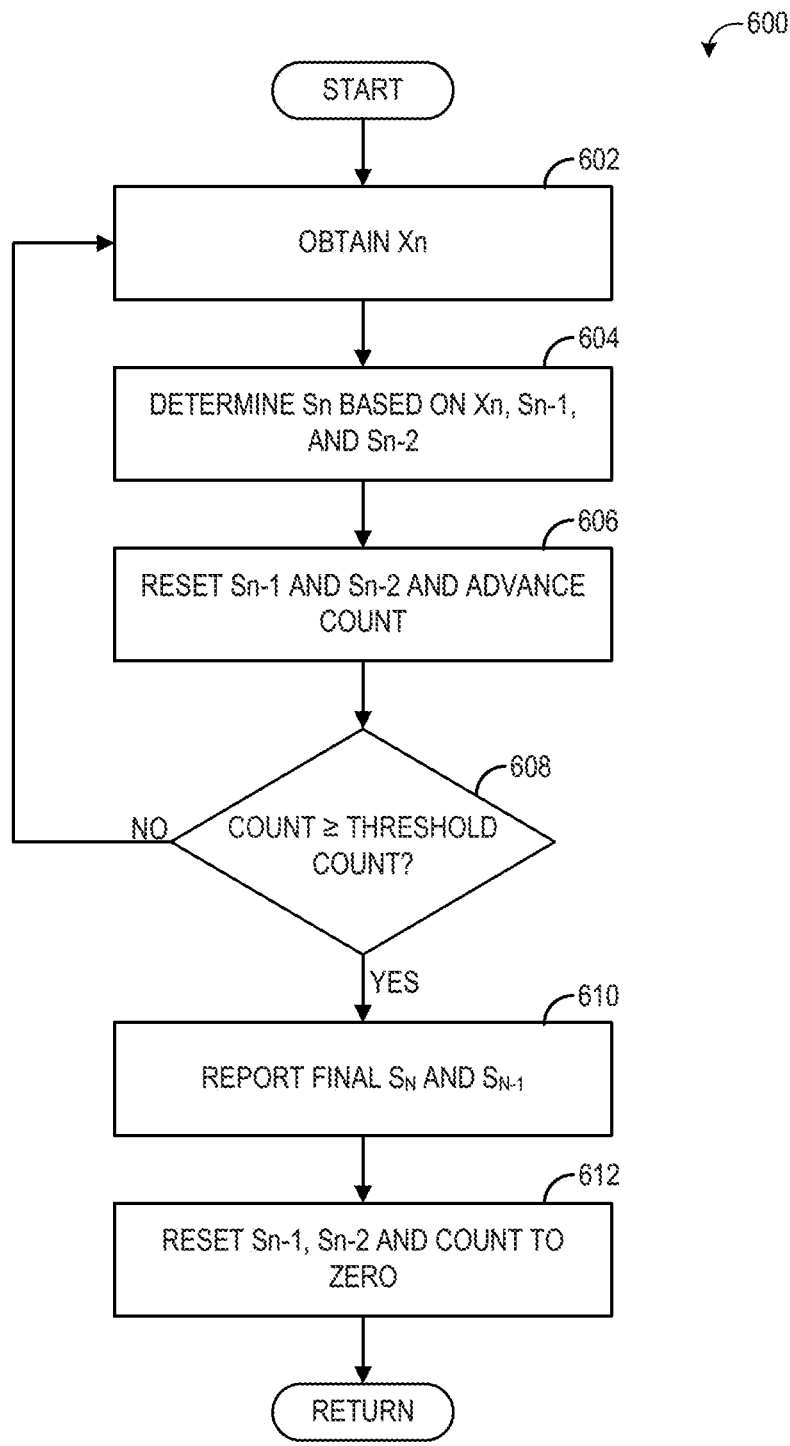
Figure 7:
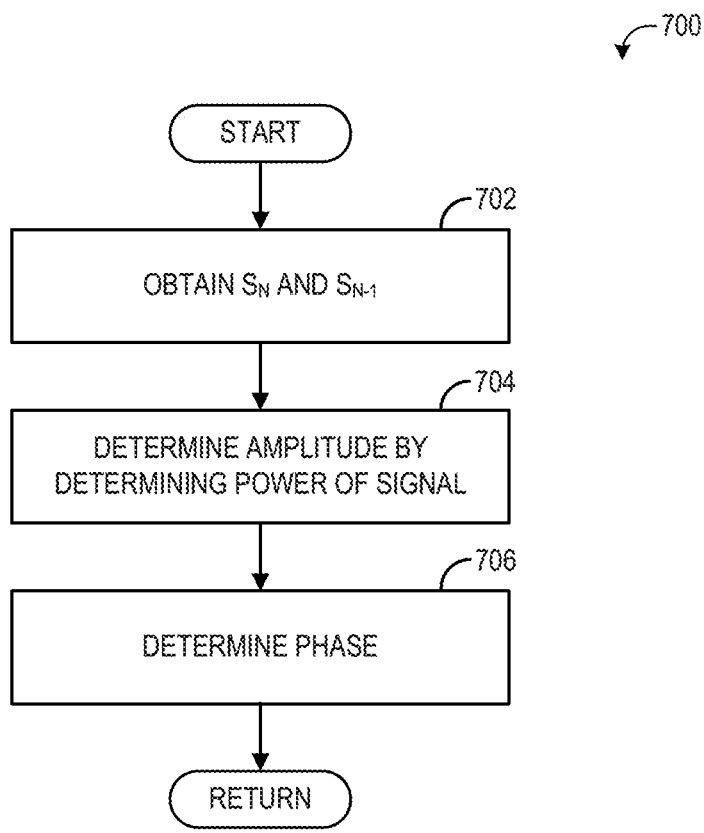

FIGS. 6-7 illustrate the recursive Goertzel algorithm described above in greater detail, which uses the variation in the existing crankshaft position sensor tooth time intervals to calculate the torsional oscillation orders of the engine crankshaft to measure engine operation. The Goertzel recursive sum is calculated between the passage of timing teeth in the lower level of the controller. After one engine cycle, the final two terms of the sum are reported to the higher level control for the calculation of order magnitude and phase, which can be used to identify weak and misfiring cylinders. Single weak or misfiring cylinders show an increased half-order torsional vibrations and multiple misfiring cylinders show increased first and higher orders in a four stroke engine.

Referring first to method 600 of FIG. 6, it illustrates the sample collection and recursive summation performed on the crankshaft sensor signal. As explained previously, the engine crankshaft has a timing wheel with evenly spaced teeth to control the injection of the fuel at the correct angular position of the engine. The passage of each tooth is read by the controller. Even though the teeth are evenly spaced, the time between teeth, DT(n) (also referred to $X_n$) varies due to the torsional oscillation of the crankshaft caused by the pulsating nature of individual cylinders firing and the elastic properties of the crankshaft. When all the cylinders fire evenly, their torque impulses into the crankshaft are fairly equal and the phase difference between the cylinders result in a low, net value of the lower torsional orders. When one cylinder's torque is lower or higher, then the rest of the torque values do not cancel out, and a higher net value of the crankshaft torsional orders can be calculated. It may be more efficient to calculate the Goertzel recursive sum terms between the passage of individual timing teeth in the lower part of the controller.

Thus, at 602, method 600 includes obtaining an $X_n$ value calculated as described above (e.g., the amount of time between when the crankshaft speed sensor detects a first tooth and when the sensor detects a second tooth, where the second tooth is the immediately adjacent tooth to the first tooth). At 604, a first term $S_n$ is determined based on $X_n$, $S_{n-1}$, and $S_{n-2}$. To determine $S_n$, the obtained $X_n$ value is entered into the equation $S_n = X_n + \text{Coeff}*S_{n-1} - S_{n-2}$, where the value of coeff depends on the order being calculated (e.g., half-order, first order, etc.) and where $S_{n-1}$ and $S_{n-2}$ are the prior two calculated $S_n$. After $S_n$ is calculated, $S_{n-1}$ is set to $S_{n-2}$, $S_n$ is set to $S_{n-1}$, and the sample count is incremented by one at 606. It is then determined at 608 if the sample count is equal to or greater than a threshold count. The threshold count may be the number of teeth that the sensor detects in one full engine cycle (e.g., two rotations of the crankshaft and thus two times the number of teeth on the wheel), or other suitable count that indicates enough data has been collected to enable a determination of the torsional vibration order(s). In one example where the wheel has 90 teeth, the count may be 180. In another embodiment, the controller may read, via the crankshaft sensor, more than one tooth of the timing wheel at a time. For example, the crankshaft sensor may capture four teeth at a time. As a result, the controller may read 45 samples for a crankshaft wheel having 90 teeth. In another example, if the crankshaft wheel has 90 teeth and the controller can capture two teeth at a time, then 90 samples may be taken. In this way, the count may change based on the number of teeth sampled at one time.

If the count is not greater than the threshold count, method 600 loops back to 602 and $S_n$ is calculated for the next $X_n$. If the count is equal to or greater than the threshold count, the two final terms, $S_N$ and $S_{N-1}$, are output at 610, and all the values are reset to zero at 612 to start over for a next engine cycle. In this way, the sum is performed for all the teeth in two revolutions of the crankshaft, and then the amplitude is calculated (described below).

The last two sum terms, $S_N$ and $S_{N-1}$ are reported to higher level logic of the controller where the magnitude and phase of the torsional vibration order frequency are calculated for that engine cycle. The amplitude and/or phase can be used to measure the overall combustion roughness of the engine or to identify individual defective, weak, or misfiring cylinders. While the methods herein have been described with respect to determining the last two sum terms on the lower level of logic and reporting them to the higher level of logic for further processing, other configurations are possible. For example, the tooth data (e.g., amount of time between the passing of each tooth or multiple teeth of the wheel) may passed from the lower level to the higher level, and all the calculations may be performed on the higher level.

FIG. 7 is a flow chart illustrating a method 700 for determining an amplitude and phase of the frequency analyzed in method 600. At 702, method 700 includes obtaining $S_N$ and $S_{N-1}$ from the lower level logic of the controller. As explained above with respect to FIG. 6, $S_N$ and $S_{N-1}$ are the final two terms output from the recursive Goertzel algorithm. As such, $S_N$ and $S_{N-1}$ represent the desired frequency component (e.g., half order) for the entire sampled signal, and include real and imaginary frequency components. The magnitude (e.g., amplitude) and phase of the signal can be determined from these two terms. Thus, at 704, the amplitude is determined based on a signal power determination. The two final terms are entered into an equation to calculate the amplitude:

$$\text{Amp} = ((S_N * w_r - S_{N-1})^2 + (S_N * w_i)^2)^{1/2} * 2/N$$

In the above equation, $W_r$ represents a real value of w (e.g., the cosine of w), where $w = (2\pi/N)*k$ and k is a constant based on a sample size, target frequency, and sample frequency. In the above equation, $W_i$ represents an imaginary value of w (e.g., the sine of w).

At 706, the phase may be calculated according to the following equation:

$$\text{Phase} = 720 - \text{MOD}(A\ \text{TAN}\ 2(S_N * w_r - S_{N-1}, S_N * w_i) * 2 + \text{Off}, 720)$$

In the above equation, MOD may refer to a modulus function, A TAN 2 may refer to an arctangent with two arguments function, and Off may be an offset, which in one example may be based on the engine position at the start of the engine cycle. As described above, the amplitude may be compared to a threshold to determine if misfire is present. If misfire is present, the phase may indicate which cylinder misfired. In one example, if no misfire is present, the phase calculated above may not provide useful information, and thus calculation of the phase may be dispensed with if no misfire is present. If misfire is present, the phase relative to the starting position of the engine may be used to determine which cylinder misfired.

In some examples, cylinder-to-cylinder variations in combustion may occur, where the variations are caused by variation in compression ratio, ring sealing, air-fuel ratio, deposits, etc., which will cause higher ½ order oscillations. The cylinder-to-cylinder variation will add to the variation caused by injector variation, so the crankshaft oscillation monitor may not be able to distinguish the cause of variation, but the remedies will be similar. For example, the liquid fuel level may be increased for individual cylinders or for the whole engine in general.

There may be a point where the injectors or cylinder conditions are so disadvantageous that the engine has to return to 100% liquid fuel or reduce power or shutdown in order to protect itself from further damage.

Furthermore, the torsional vibration crankshaft monitor may also detect gradual degradation in combustion quality. As the ignition of the gaseous fuel degrades, the cycle-to-cycle power variation for an individual cylinder and among all the cylinders in a multi-cylinder engine may increase. The term "Coefficient of Variation" (COV) is the standard deviation of the power output of the cylinders divided by the mean power output. The COV value can be monitored and optimized by adjusting the fuel duration to individual cylinders or the whole engine in general.

Figure 10:
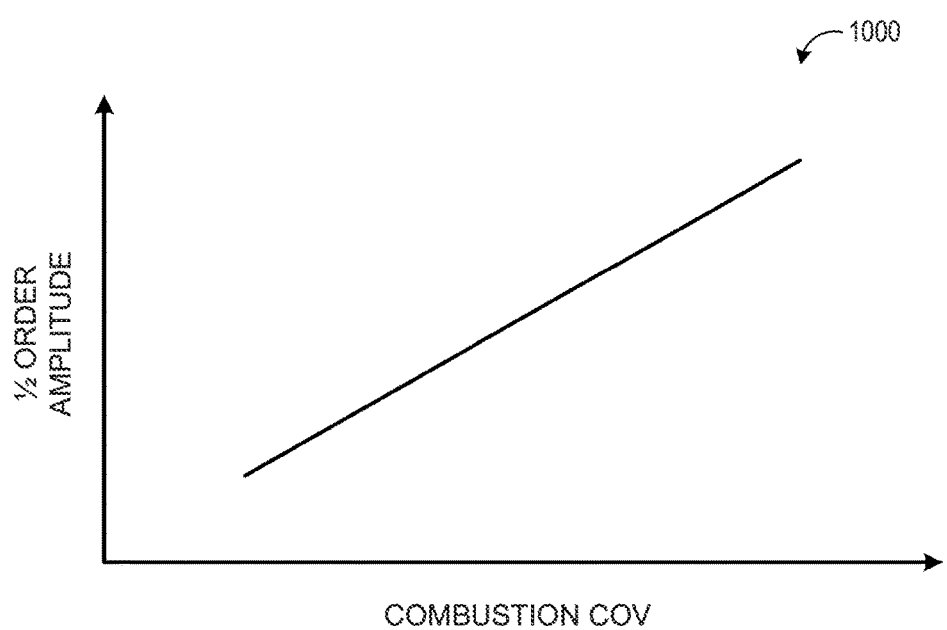
FIG. 10 is a graph illustrating ½ order amplitude as a function of combustion variation.
Figure 11:
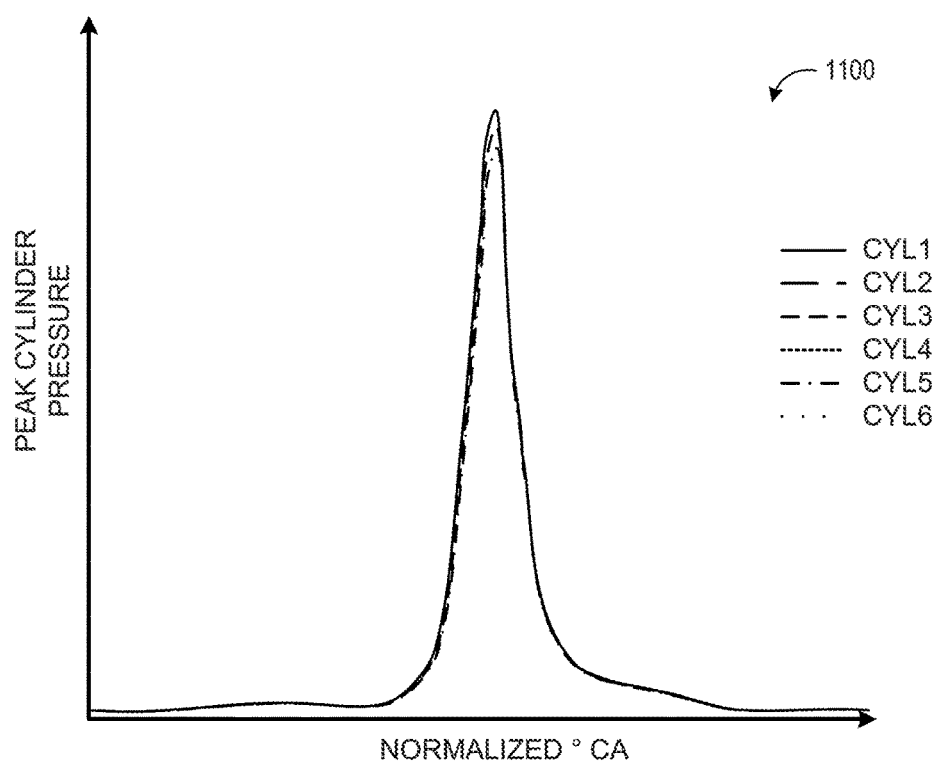
FIGS. 11-14 are graphs illustrating various parameters in an engine operating with either 2% combustion variation or 10% combustion variation.
Figure 12:
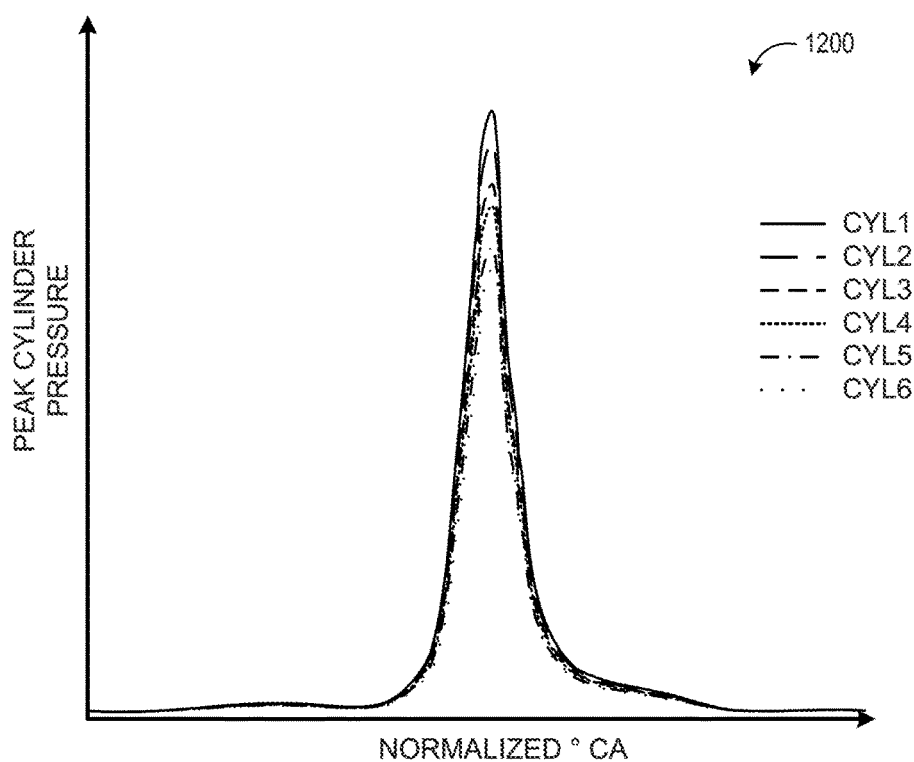
Figure 13:
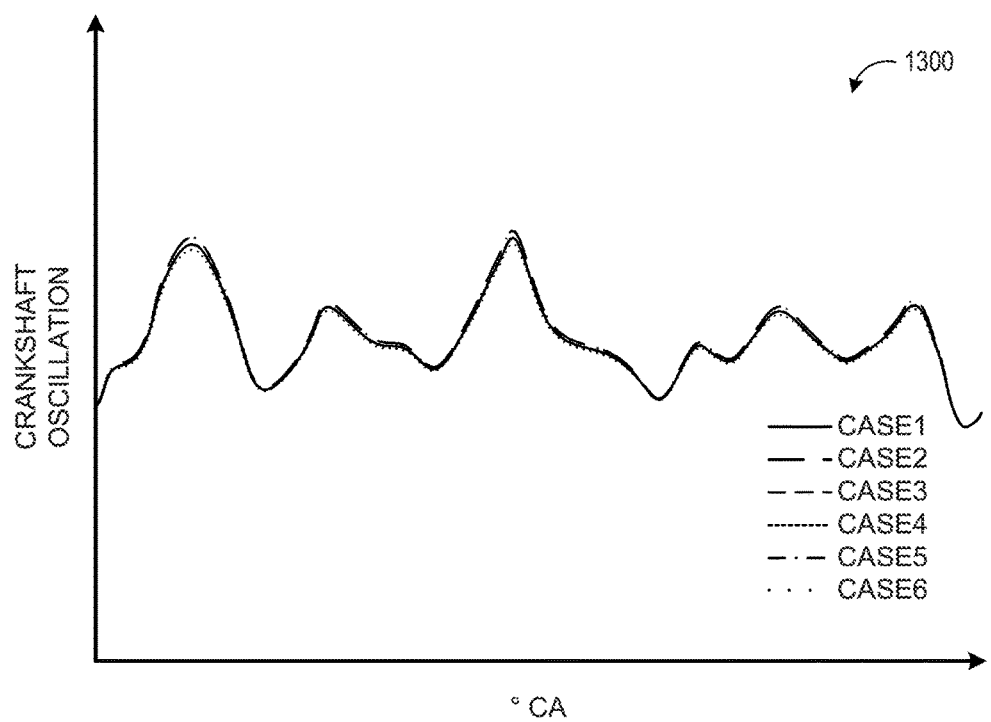
Figure 14:
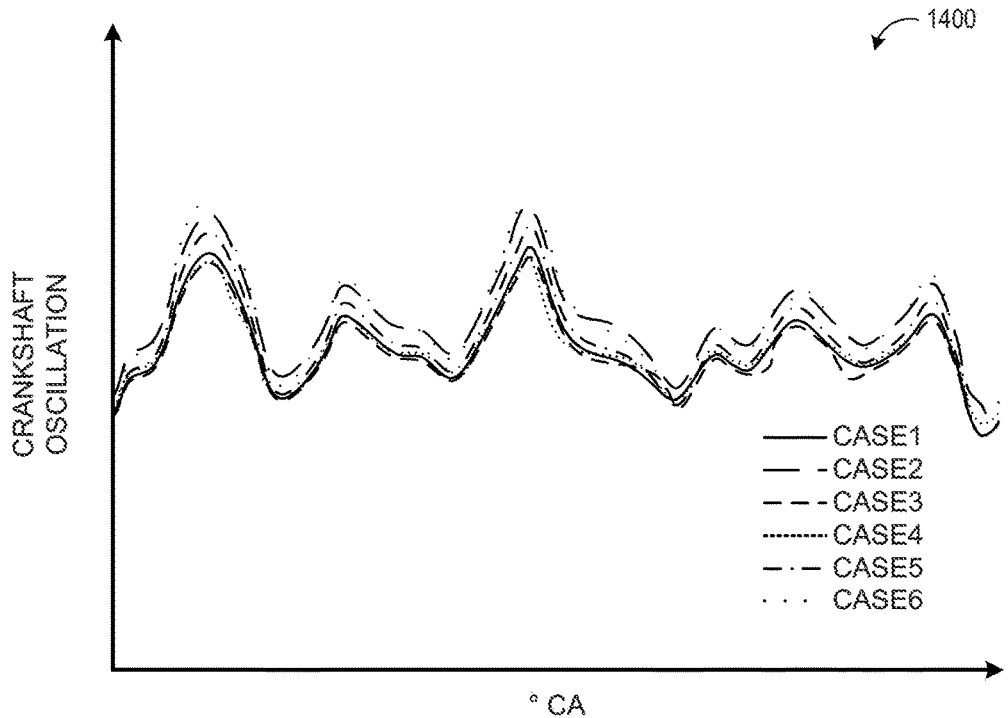

As shown by diagram 1000 of FIG. 10, the ½ order response is directly proportional to the combustion variation (e.g., linearly proportional). Further, as shown by FIGS. 11-14, the larger the COV, the greater the ½ order amplitude. For example, diagram 1100 of FIG. 11 shows the peak cylinder pressure for six cylinders of a 12-cylinder engine operating with 2% COV and diagram 1200 of FIG. 12 shows the peak cylinder pressure for each of the six cylinders when the engine is operating with 10% COV. When operating with 2% COV, the ½ order amplitude is equal to 0.025, while when operating at 10% COV, the ½ order amplitude is equal to 0.120. As can be seen in FIGS. 13-14, the crankshaft oscillation varies to a higher degree from engine cycle to engine cycle (e.g., cases 1-6) when the engine is operating with 10% COV (shown by diagram 1300 of FIG. 13), as compared to when the engine is operating with 2% COV (shown by diagram 1400 of FIG. 14).

An embodiment of a system comprises an engine having a plurality of cylinders coupled to a crankshaft; a crankshaft speed sensor; and a controller. The controller is configured to measure one or more torsional vibration orders of the engine based on signals from the crankshaft speed sensor; determine a phase and an amplitude of the one or more torsional vibration orders; and when the amplitude is greater than a threshold, indicate misfire in at least one of the plurality of cylinders. The controller may be further configured to, if misfire is indicated, determine which cylinder of the plurality of cylinders is misfiring based on the phase. The controller may be additionally or alternatively further configured to, if misfire is indicated, increase a fuel injection amount to the misfiring cylinder. The controller may additionally or alternatively be configured to determine a level of combustion variation among the plurality of cylinders based on the amplitude. The controller may be further configured to, when the level of combustion variation is greater than a threshold variation, adjust a fuel injection amount to one or more cylinders of the engine. The engine may be configured to operate with at least a first fuel and a second fuel. To increase the fuel injection amount to the misfiring cylinder, the controller may be configured to increase a fuel injection amount of the first fuel relative to the second fuel. The first fuel may be a liquid fuel and the second fuel may be a gaseous fuel. The controller may be configured to determine, for each cylinder of the plurality of cylinders, a misfire limit for each operating point of a plurality of operating points based on an amplitude of the one or more torsional vibration orders measured across the plurality of operating points. The misfire limit for a given cylinder of the plurality of cylinders may include a minimum open duration for a liquid fuel injector coupled to the given cylinder. The controller may be further configured to operate each cylinder of the plurality of cylinders at a respective predetermined ratio of gaseous fuel to liquid fuel, each predetermined ratio including a maximum amount of gaseous fuel to deliver requested engine output while remaining above a respective misfire limit.

An embodiment relates to a method comprising measuring one or more torsional vibration orders of an engine having a plurality of cylinders based on signals from a crankshaft speed sensor; determining a phase and an amplitude of the one or more torsional vibration orders; and if the amplitude is greater than a threshold, indicating misfire in at least one of the plurality of cylinders. The method may further include, if misfire is indicated, determining which cylinder of the plurality of cylinders is misfiring based on the phase. The method may additionally or alternatively include, if misfire is indicated, increasing a fuel injection amount to the misfiring cylinder. The method may additionally or alternatively include determining a level of combustion variation among the plurality of cylinders based on the amplitude. In one example, the one or more torsional vibration orders may include a half-order torsional vibration.

An embodiment relates to a system comprising an engine having a plurality of cylinders, the engine configured to operate with at least a first fuel and a second fuel; a plurality of fuel injectors to inject the first fuel to the plurality of cylinders; and a controller. The controller is configured to, when operating under a tuning mode, operate the engine with both the first fuel and the second fuel and determine a minimum open duration for each of the plurality of injectors that sustains combustion; and when operating under a second fuel mode, open each injector at its determined minimum open duration to initiate combustion. The minimum open duration for each of the plurality of injectors may be determined based on a misfire monitor that determines cylinder misfire based on signals from a crankshaft speed sensor. The system may additionally or alternatively include the first fuel being liquid fuel and the second fuel being gaseous fuel, and the controller may additionally or alternatively be configured to supply a gaseous fuel-air mixture to each cylinder during the second fuel mode. The system may additionally or alternatively include the tuning mode being performed at given engine speed and/or load, and the second fuel mode comprising engine operation at the given engine speed and/or load. In an example, each respective minimum open duration comprises the respective minimum open duration that does not cause cylinder misfire. The system may additionally or alternatively include the controller being configured to determine cylinder misfire with the misfire monitor by determining half-order torsional oscillation of a crankshaft of the engine based on the signals from the crankshaft speed sensor. In an example, a first injector of the plurality of fuel injectors has a first minimum open duration and a second injector of the plurality of fuel injectors has a second minimum open duration that is different than the first minimum open duration, and a quantity of fuel delivered by the first injector at the first minimum open duration is the same as a quantity of fuel delivered by the second injector at the second minimum open duration.

An embodiment relates to a method for a system, the system including an engine having a plurality of cylinders, the engine configured to operate with at least a first fuel and a second fuel, a plurality of fuel injectors to inject the first fuel to the plurality of cylinders, and a controller. The method comprises, when operating under a tuning mode, operating the engine with both the first fuel and the second fuel and determining a minimum open duration for each of the plurality of injectors that sustains combustion; and when operating under a second fuel mode, opening each injector at its determined minimum open duration to initiate combustion. The minimum open duration for each of the plurality of injectors may be determined based on a misfire monitor that determines cylinder misfire based on signals from a crankshaft speed sensor. The method may additionally or alternatively include the first fuel being liquid fuel and the second fuel being gaseous fuel and supplying a gaseous fuel-air mixture to each cylinder during the second fuel mode. The method may additionally or alternatively include the tuning mode being performed at given engine speed and/or load, and the second fuel mode comprising engine operation at the given engine speed and/or load. The method may additionally or alternatively include determining cylinder misfire with the misfire monitor by determining half-order torsional oscillation of a crankshaft of the engine based on the signals from the crankshaft speed sensor.

An embodiment relates to a system comprising an engine having a plurality of cylinders coupled to a crankshaft, a crankshaft speed sensor, and a controller. The controller is configured to measure half-order torsional vibration of the engine based on signals from the crankshaft speed sensor, determine a coefficient of variation (COV) of the plurality of cylinders based on the measured half-order torsional vibration, and adjust fuel duration to one or more of plurality of cylinders based on the COV. The COV may comprise a standard deviation of a power output of the plurality of cylinders divided by a mean power output. The controller may be further configured to determine the COV based on peak cylinder pressure for each of the plurality of cylinders. The engine may be configured to combust at least a first fuel and a second fuel, and to adjust the fueling duration to one or more of the plurality of cylinders, the controller may be configured to adjust fueling duration of the first fuel relative to the second fuel. The first fuel may be liquid fuel and the second fuel may be gaseous fuel.

Thus, the embodiments described herein may apply a misfire monitor to detect misfire during certain operating conditions, such as when tuning fuel injectors to enable operation with high amounts of gaseous fuel. However, the misfire monitor described above with respect to FIGS. 5-8 may be used during other operating conditions to detect misfire, such as during steady state operating conditions, with both dual fuel engines (as described above) and other engine configurations (such as liquid fuel only). Further, the misfire monitor described above with respect to FIGS. 5-8 is configured to detect instances where only one cylinder is misfiring per engine cycle, herein referred to as single-cylinder misfire. While only monitoring for single cylinder misfire is suitable for tuning the fuel injectors (e.g., due to the tuning process including purposeful introduction of misfire in one cylinder at a time), if the misfire monitor is executed during other operating conditions, other types of misfire events may be missed. While single cylinder misfire is relatively common compared to other types of misfire, it is not the only type of misfire that may occur. For example, two or more cylinders may misfire in one engine cycle, referred to herein as multi-cylinder misfire. Some multi-cylinder misfire events may appear similar to single-cylinder misfire events, at least with respect to the effect the misfires have on the torsional vibrations of the engine. Thus, at least in some examples, a single-cylinder misfire may be indicated based on the engine torsional vibrations when in actuality a multi-cylinder misfire event is occurring. Such misidentification of the misfire event may lead to erroneous misfiring cylinder identification, missed misfire detection, and other issues that may result in persistent misfiring, unnecessary fueling corrections that may compromise fuel economy and/or emissions, and possible engine degradation.

Thus, according to embodiments disclosed herein, the output from the crankshaft speed sensor may be used to differentiate single-cylinder misfire events from multi-cylinder misfire events. Specifically, the Goertzel recursive sum described above with respect to FIG. 6 may be used on the output from the crankshaft speed sensor to determine both the half-order frequency component amplitude (also referred to as the half-order power or half-order amplitude) and the first-order frequency component amplitude (also referred to as the first-order power or the first-order amplitude). The relative magnitudes of the half-order and first-order powers may be compared relative to each other and to various thresholds, along with exhaust temperature of each cylinder bank, in order to differentiate single-cylinder misfire events from multi-cylinder misfire events.

Once misfire is identified, a cylinder identification test may performed to identify which cylinder(s) is misfiring. The identification test may be similar to a pop test, wherein during engine idle operation or other low load condition, each cylinder is sequentially over-fueled until a "pop" sound is heard. Absence of such a pop sound may indicate cylinder issues, such as a degraded fuel injector. However, the pop test is fuel-intensive and may not accurately detect subtle combustion issues. Thus, according to embodiments disclosed herein, during the pop test, output from the crankshaft speed sensor may be collected for each over-fueling event, processed according to the Goertzel recursive sum described above to determine the amplitude of the half-order frequency component of the signal, for example, and compared to a threshold in order to determine if a given cylinder is misfiring. By analyzing the output from the crankshaft speed sensor, the amount of fuel supplied to each cylinder during the over-fueling events may be reduced.

Figure 15:
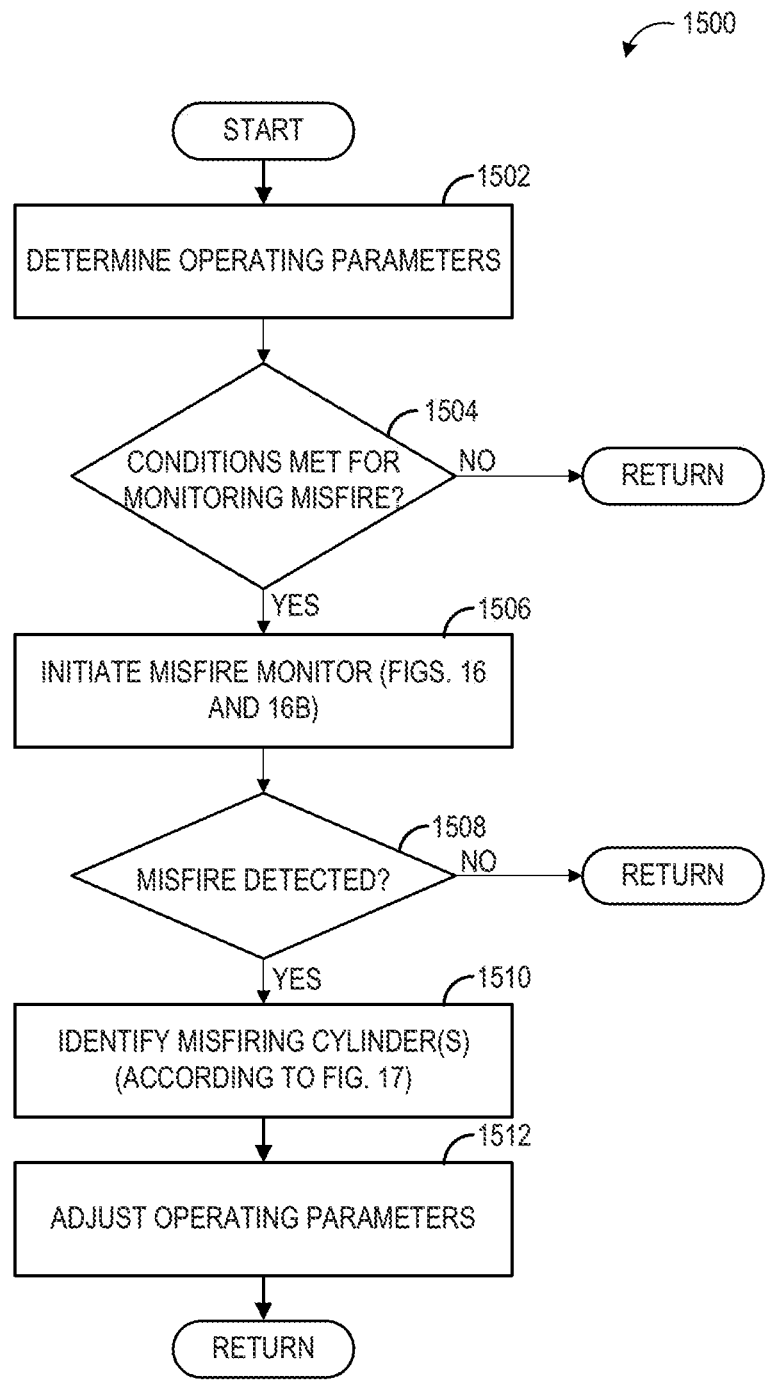
FIG. 15 is a high level flow chart illustrating a method for operating an engine.

Turning to FIG. 15, a flow chart illustrating a method 1500 for operating an engine is presented. Method 1500 may be carried out by a controller, such as controller 110 of FIGS. 1-3, according to non-transitory instructions stored thereon and in combination with one or more sensors, such as crankshaft speed sensor 209, temperature sensors 320 and 322, and/or other sensors as well as one or more actuators (e.g., fuel injectors). At 1502, method 1500 includes determining engine operating parameters. The determined operating parameters may include, but are not limited to, engine speed, engine torque demand, engine temperature, and other operating parameters. At 1504, method 1500 includes determining if conditions for executing the misfire monitor are met. The conditions for executing the misfire monitor may include the monitor having not been performed prior (e.g., during the first operating period after manufacture of the engine, or following maintenance), or a threshold duration (of time, engine cycles, vehicle distance traveled, etc.) having lapsed since a prior monitor was performed. The misfire monitor entry conditions may also include operating conditions that minimize engine torsional vibrations, engine acceleration, and/or other interfering signals. These conditions may include steady state operation where engine speed and power are changing by less than a threshold amount (e.g., within 5% of a given speed or power).

If the conditions for monitoring misfire are not present, method 1500 returns to continue to monitor operating conditions until the conditions are met. When the conditions for executing the misfire monitor are met, method 1500 proceeds to 1506 to initiate the misfire monitor. The misfire monitor will be explained in detail below with respect to FIGS. 16A and 16B. Briefly, multiple frequency components of the frequency content of the signal output by the crankshaft speed sensor are analyzed, along with exhaust temperature, to identify misfire and differentiate single cylinder misfire from multi-cylinder misfire.

At 1508, method 1500 determines if misfire is indicated. If no misfire is indicated, method 1500 returns. As such, due to the lack of misfire, further operating parameter adjustments described below (e.g., with respect to 1512 of method 1500) may not be performed. If misfire is detected, method 1500 proceeds to 1510 to identify which cylinder(s) is misfiring according to a cylinder identification test. The cylinder identification test will be described in more detail below with respect to FIG. 17. Briefly, each cylinder may be sequentially over-fueled and the frequency content of the signal output by the crankshaft speed sensor may be analyzed to determine if a given cylinder is misfiring. However, other mechanisms are possible for identifying the misfiring cylinder(s), such as based on the phase of the half-order or first order frequency component and/or cylinder firing order.

At 1512, method 1500 includes adjusting one or more operating parameters based on the misfiring cylinders. The adjusted operating parameters may include adjusting fuel injection parameters of the misfiring cylinder(s), such as adjusting an amount, duration, and/or timing of fuel injection to the misfiring cylinder(s). Other operating parameter adjustments may include exhaust gas recirculation amount, boost pressure, etc. Further, responsive to the indication of misfire, a diagnostic code may be set to indicate the misfire, where the code is stored in memory of the controller, and/or the controller may generate a message sent to a recipient or displayed on a display coupled to the controller in or exterior to the vehicle. Further still, responsive to misfire, the engine may be derated or shut down to avoid engine degradation.

Additionally, the adjustment to the engine operating parameters may be performed differently when single-cylinder misfire is identified as opposed to multi-cylinder misfire. For example, when multi-cylinder misfire is identified, fuel injection parameters may be adjusted for multiple cylinders (e.g., the misfiring cylinders), rather than just one cylinder when single-cylinder misfire is identified. Further, when multiple cylinders are misfiring, EGR adjustments may be used to control the misfire, while a single cylinder misfire may be controlled without adjusting EGR. For example, EGR adjustments may compromise performance or emissions, and thus may not be desirable if only one cylinder is misfiring. However, such a tradeoff may be more desirable when multiple cylinders are misfiring, as such adjustments may prevent engine degradation that is more likely to occur when multiple cylinders are misfiring. Method 1500 then returns.

Figure 16A:
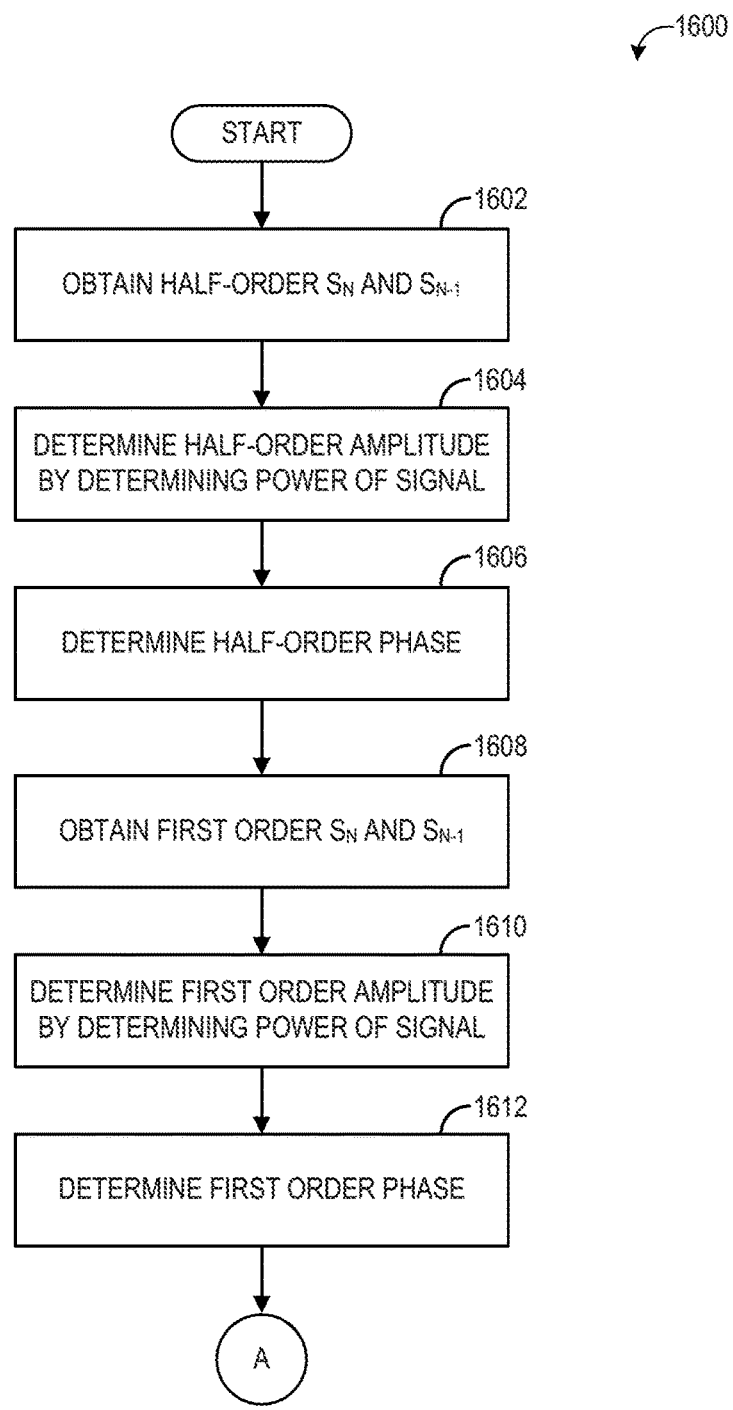
FIGS. 16A and 16B are flow charts illustrating a method for performing multi-cylinder misfire detection.
Figure 16B:
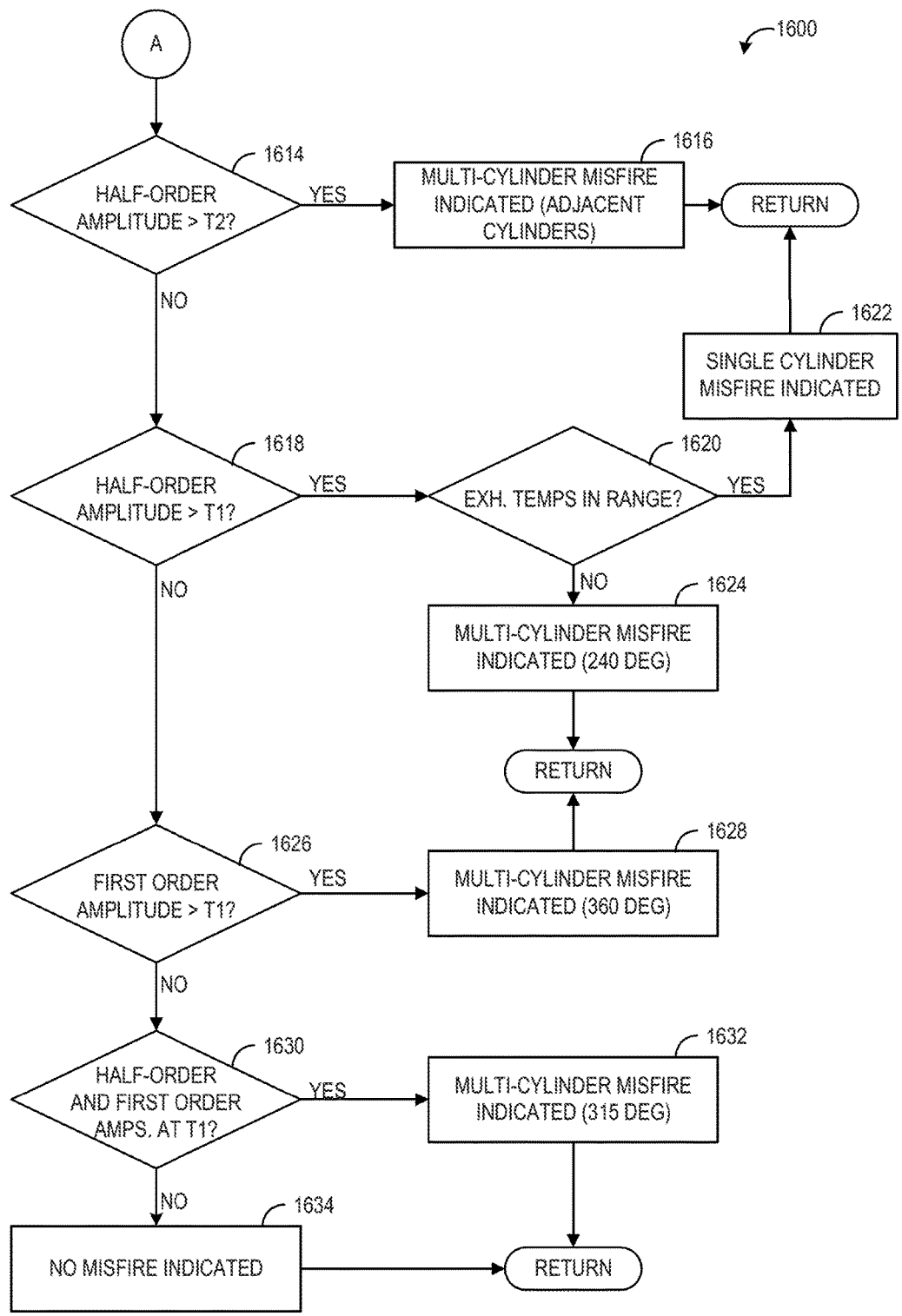

FIGS. 16A and 16B illustrate a method 1600 for detecting cylinder misfire with a misfire monitor that is configured to differentiate single cylinder misfire from multi cylinder misfire. Method 1600 may be performed as part of method 1500 (e.g., in response to an indication to execute the misfire monitor). At 1602, method 1600 includes obtaining half-order $S_N$ and $S_{N-1}$. As explained above with respect to FIG. 6, $S_N$ and $S_{N-1}$ are the final two terms output from the recursive Goertzel algorithm. As such, $S_N$ and $S_{N-1}$ represent the desired frequency component (e.g., half order) for the entire sampled signal of the crankshaft speed sensor, and include real and imaginary frequency components. The magnitude (e.g., amplitude) and phase of the signal can be determined from these two terms. Thus, at 1604, the half-order amplitude is determined based on a signal power determination and at 1606, the half-order phase is determined. The half-order $S_N$ and $S_{N-1}$ may be calculated similar to the calculation described above with respect to FIG. 6, utilizing a coefficient specific for the half-order frequency component. The half-order amplitude and phase may each be calculated similar to the calculation described above with respect to FIG. 7.

At 1608, method 1600 includes obtaining first-order $S_N$ and $S_{N-1}$. As explained above with respect to FIG. 6, $S_N$ and $S_{N-1}$ are the final two terms output from the recursive Goertzel algorithm. As such, $S_N$ and $S_{N-1}$ represent the desired frequency component (e.g., first order) for the entire sampled signal of the crankshaft speed sensor, and include real and imaginary frequency components. The magnitude (e.g., amplitude) and phase of the signal can be determined from these two terms. Thus, at 1610, the first-order amplitude is determined based on a signal power determination and at 1612, the first-order phase is determined. The first-order $S_N$ and $S_{N-1}$ may be calculated similar to the calculation described above with respect to FIG. 6, utilizing a coefficient specific for the first-order frequency component. The first-order amplitude and phase may each be calculated similar to the calculation described above with respect to FIG. 7.

Figure 18A:
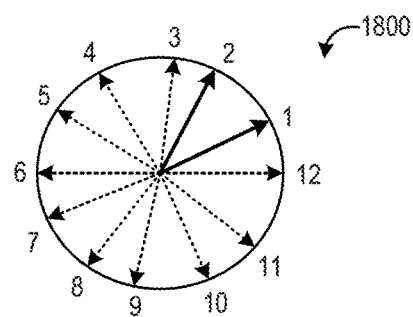
FIGS. 18A-18D are examples of cylinder firing plots.

Referring now to FIG. 16B, method 1600 continues and compares the half-order and first-order amplitudes to various thresholds to identify misfire and differentiate single-cylinder misfire from multi-cylinder misfire. However, multiple types of multi-cylinder misfire are possible based on the cylinder arrangement and firing order of the engine, and the different types of multi-cylinder misfire may affect the torsional vibrations of the engine differentially. Thus, as described in more detail below, the multi-cylinder misfire events are classified into four general categories based on relative positioning of the misfiring cylinders during a given engine cycle. For example, a first category may include two misfiring cylinders that fire adjacent one another in the firing order. This may include a cylinder that fires first in the firing order and the cylinder that fires second in the firing order, and does not necessarily include cylinders that are physically adjacent on a cylinder bank. FIG. 18A shows a first wagon wheel diagram 1800 illustrating firing events 1-12 of a twelve cylinder engine, where each cylinder fires once per traversal of the wagon wheel. While twelve cylinders are plotted on a single circle, it is to be understood that one traversal of the circle of diagram 1800 represents 720 degrees C.A, a single engine cycle. As shown by diagram 1800, an adjacent cylinder multi-cylinder misfire event may include cylinder misfiring event 1 and cylinder misfiring event 2. In one example, the engine represented by wagon wheel diagram 1800 may have a firing order of L1-R5-L5-R3-L3-R6-L6-R2-L2-R4-L4-R1, and thus the cylinder misfiring event 1 may include misfire of cylinder L1 and cylinder misfiring event 2 may include misfire of cylinder R5. In the engine illustrated in FIG. 3, this may correspond to cylinders 1 and 11 misfiring (where the engine of FIG. 3 has a firing order of 1-11-5-9-3-12-6-8-2-10-4-7). However, alternate firing orders are possible with applying the methods described herein.

Figure 18B:
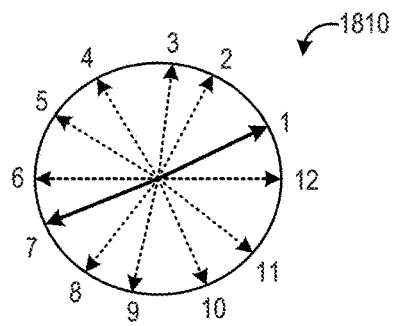

Another example category includes two misfiring cylinders that fire 360 degrees apart from one another in the engine firing order, such as a cylinder that fires at 0 degrees C.A and a cylinder that fires at 360 degrees C.A in a given engine cycle (where the engine cycle spans 720 degrees C.A). FIG. 18B illustrates a second wagon wheel diagram 1810 showing misfire of two cylinders spaced 360 degrees apart. A cylinder misfiring event 1 and cylinder misfiring event 7 are shown in diagram 1810. This may correspond to cylinders L1 and L6 (cylinders 1 and 6 of FIG. 3).

Figure 18C:
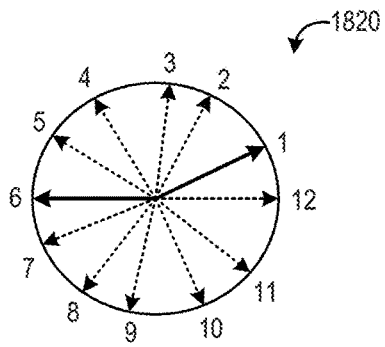

A further example category includes two misfiring cylinders that fire at 315 degrees apart from one another in the engine firing order. FIG. 18C illustrates a third wagon wheel diagram 1820 showing misfire of two cylinders spaced 315 degrees apart. A cylinder misfiring event 1 and cylinder misfiring event 6 are shown in diagram 1820. This may correspond to cylinders L1 and R6 (cylinders 1 and 12 of FIG. 3).

Figure 18D:
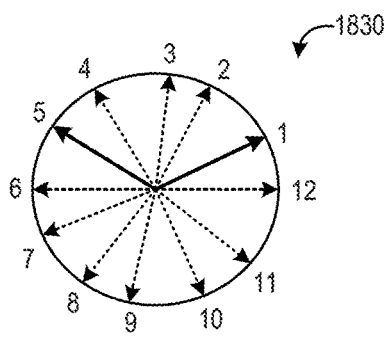

An additional example category includes two misfiring cylinders that fire at 240 degrees apart from one another. FIG. 18D illustrates a fourth wagon wheel diagram 1830 showing misfire of two cylinders spaced 240 degrees apart. A cylinder misfiring event 1 and cylinder misfiring event 5 are shown in diagram 1830. This may correspond to cylinders L1 and L3 (cylinders 1 and 3 of FIG. 3).

It is to be understood that the example categories described above are with respect to one cylinder (L1) and that each cylinder has similar categories associated with it. For example, for cylinder L2 misfiring, an adjacent cylinder misfiring may include cylinder R2 or cylinder R4 misfiring, a 360 degree misfire category would include cylinder L2 and cylinder L5 misfiring, a 315 degree misfire category would include cylinder L2 and cylinder R5, and a 240 degree misfire category would include cylinder L2 and cylinder R1.

Each of the four categories may have a specific signature of half-order amplitude, first-order amplitude, and/or exhaust temperature profile that is distinct from single-cylinder misfire and no cylinder misfire. It is to be understood that the four categories described herein are described with respect to a four-stroke, twelve-cylinder engine arranged into two banks, and that other categories may be possible for different engine configurations.

Returning to FIG. 16B, at 1614, method 1600 determines if the half-order amplitude is greater than a multi-cylinder misfire threshold, T2. The multi-cylinder misfire threshold T2 may be greater than the threshold used in the method 500 of FIG. 5 to indicate single-cylinder misfire. In one example, the threshold T2 may be twice as large as the single-cylinder misfire threshold (referred to as T1 herein). For example, T1 may be 0.5 and T2 may be 1, but other thresholds are possible. If the half-order amplitude is greater than the threshold T2, method 1600 proceeds to 1616 to indicate a multi-cylinder misfire event, where the multi-cylinder misfire event includes adjacent firing cylinders. Method 1600 then returns.

If the half-order amplitude is not greater than the threshold T2, method 1600 proceeds to 1618 to determine if the half-order amplitude is greater than the single-cylinder misfire threshold, T1. If the half-order amplitude is greater than the threshold T1, method 1600 proceeds to 1620 to determine if the exhaust temperatures of the two cylinder banks are in a threshold range of each other. When the half-order amplitude is greater than the single-cylinder misfire threshold T1, but less than the multi-cylinder misfire threshold T2, it may be assumed that at least one cylinder is misfiring. Further, when only one cylinder is misfiring, the first-order amplitude may also be greater than T1 and less than T2. However, for the 240 degree separation multi-cylinder misfiring category described above, the half-order amplitude and the first-order amplitude may both be greater than T1 but less than T2. As such, it may be difficult to differentiate single-cylinder misfire from 240 degree multi-cylinder misfire on the basis of the output from the crankshaft speed sensor alone. Thus, the relative exhaust temperatures of each cylinder bank may be assessed to differentiate these types of misfire events. For cylinders that misfiring that are 240 degrees apart, the cylinders are positioned on the same bank. Hence, the two misfiring events significantly impact the exhaust temperature of that cylinder bank relative to a single-cylinder misfire event.

Accordingly, if the exhaust temperatures of the first and second (e.g., right and left) cylinder banks are within range of each other (for example, if the temperatures are within 200 degrees F. or 100 degrees C.), method 1600 proceeds to 1622 to indicate a single-cylinder misfire event is occurring, and then method 1600 returns. If the exhaust temperatures are not in range, for example if the temperature sensed by temperature sensor 320 is 200 degrees F. (or 100 degrees C.) or more different than the exhaust temperature sensed by temperature sensor 322, method 1600 proceeds to 1624 to indicate a multi-cylinder misfire event of the 240 degree separation category. Method 1600 then returns.

Returning to 1618, if it is determined that the half-order amplitude is not greater than the threshold T1, method 1600 proceeds to 1626 to determine the first order amplitude is greater than the threshold T1. If the first order amplitude is greater than the threshold T1, method 1600 proceeds to 1628 to indicate a multi-cylinder misfire event of the 360 degree separation category, and then method 1600 returns. If the first order amplitude is not greater than the threshold T1, method 1600 proceeds to 1630 to determine if both the half order and first order amplitudes are at the threshold T1. As used herein, "at the threshold T1" may include the amplitudes being equal to the threshold and/or within a threshold range of the threshold, such as within 40% of the threshold T1. For example, if the threshold T1 is 0.5, both the amplitudes may be considered at the threshold if each amplitude is within 0.2 of the threshold. If both the amplitudes are at the threshold T1, method 1600 proceeds to 1632 to indicate a multi-cylinder misfire event of the 315 degree separation category, and then method 1600 returns. If the half-order and the first-order amplitudes are not at the threshold T1, for example, if both of the amplitudes are less than the threshold T1, method 1600 proceeds to 1634 to indicate that no misfire is occurring, and then method 1600 returns.

Thus, multi-cylinder misfire events may be detected and differentiated from single-cylinder misfire events using the Goertzel sum power levels and exhaust temperature. Different combinations of cylinder misfire will results in different Goertzel power levels. For two cylinders that fire adjacent each other, if the two cylinders misfire, the half-order power level (e.g., amplitude) will be much higher than the threshold used to identify single-cylinder misfire. For example, single-cylinder misfire may result in half-order power levels of 0.5-0.9, while adjacent multi-cylinder misfire may result in half-order power levels of 1.2-1.9. The first order power level may also be relatively high, such as around 1.

However, other categories of misfire may be more subtle. For example, diagonally opposite cylinders (e.g., 360 degrees C.A apart in the firing order), the half-order power level is low as the torsional vector forces act opposite each other. However, the first order power level may be high enough to indicate misfire. Thus, misfire of cylinder separated by 360 degrees C.A in the firing order may be detected based on the first order power level being above a threshold, such as above 0.5, with the half-order power level being below the threshold.

When two cylinders which are 315 degrees apart in the firing order each misfire, then both the half order and the first order torsional power values are very close and nearby to, but greater than, the healthy cylinder power level (e.g., near but above 0.5). As this combination is very close to 360 degrees apart, the half-order power level starts decreasing and the first order power starts increasing. As such, the difference between the power levels will be used which are close and around the healthy threshold (e.g., 0.5) to detect multi cylinder misfire. Further, as this power level signature is similar to and may overlap with single cylinder misfire, this type of multi-cylinder misfire may be differentiated by the engine power at the time of the analysis (e.g., the notch level power). For example, if the power levels remain near the threshold T1 (e.g., between 0.3-0.7) even at maximum rated engine power, multi-cylinder misfire may be indicated.

When two cylinders which are 240 degrees apart misfire, then both half order and first order torsional power values fall under the values of single cylinder misfired case. Thus, it may be difficult to differentiate between the single and multi-cylinder misfire. Thus, the exhaust temperature profile is also analyzed. The difference between the left bank (pre-turbine) and right bank (pre-turbine) temperature values will indicate if the multi cylinder misfire is occurring. For example, for the temperature profile, the raw left bank and right bank temperature values are measured and the difference is of magnitude >200 degrees F. For healthy or single cylinder misfire, the difference is not more than 50 degrees F. (10 degrees C.).

Figure 17:
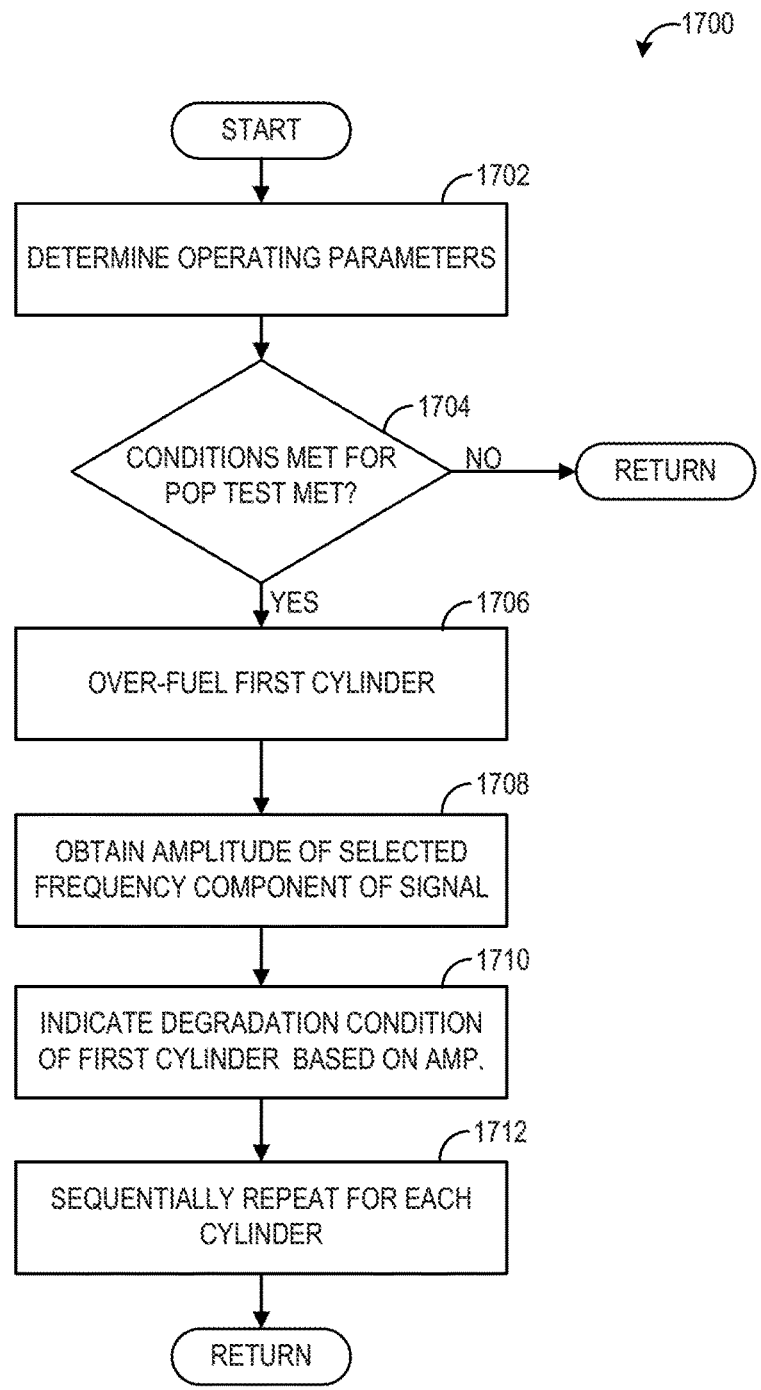
FIG. 17 is a flow chart illustrating a method for performing a cylinder identification test.

Turning to FIG. 17, a method 1700 for identifying misfiring cylinder(s) according to a pop test is presented. Method 1700 may be carried out as part of method 1500, for example in response to an indication that misfire is occurring. In other examples, method 1700 may be carried out independent of method 1500. Method 1700 may be carried out by a controller, such as controller 110 of FIGS. 1-3, according to non-transitory instructions stored thereon and in combination with one or more sensors, such as crankshaft speed sensor 209, as well as one or more actuators (e.g., fuel injectors).

At 1702, method 1700 includes determining engine operating parameters. The determined parameters may include engine speed, engine load, time since a previous cylinder identification was carried out, engine misfire status (e.g., if a misfire is indicated as occurring), and other parameters. At 1704, method 1700 includes determining if conditions for a cylinder pop test are met. The conditions for carrying out the pop test may include previous identification of cylinder misfire or a threshold amount of time (or distance or engine cycles) having elapsed since a previous pop test was carried out. Further, the pop test may be carried out during low engine speed conditions, such as less than 440 RPM. As such, the conditions for carrying out the pop test may include engine idle conditions or during an engine start.

If the conditions for carrying out the pop test are not met, method 1700 returns to continue monitor conditions until the conditions are met. Once the conditions are met, method 1700 proceeds to 1706 to over-fuel a first cylinder of the engine. The first cylinder may be over-fueled by a specific amount for a specific duration (e.g., 2-10 seconds). During the period of over-fueling, the amplitude/power level of a selected frequency component of a crankshaft speed signal is obtained, as indicated at 1708. For example, the half-order power level for the crankshaft speed signal may be obtained, similar to the calculation described above with respect to FIGS. 6 and 7.

At 1710, method 1700 indicates a degradation condition of the first cylinder based on the amplitude. In one example, cylinder misfire may be indicated when the half-order amplitude is less than a healthy cylinder threshold. In one example, the threshold may be 3, but other thresholds are possible. During the low engine speed conditions of the pop test, a cylinder that is degraded (e.g., misfiring) may be indistinguishable from a healthy cylinder. However, when a cylinder is over-fueled during the low engine speed conditions, the half-order amplitude increases significantly, such as to 5 or greater. Thus, if an over-fueled cylinder does not exhibit increased half-order amplitude, the cylinder may be misfiring, weak, or otherwise degraded.

At 1712, the process is repeated sequentially for each cylinder. For example, the fueling of the first cylinder is returned to normal fueling amounts and a second cylinder is over-fueled. The half-order amplitude is then obtained and compared to the threshold and a degradation condition of the second cylinder is indicated based on the amplitude. When a degradation condition is detected of one or more cylinders of the engine, engine operating parameters may be adjusted, similar to the adjustments explained above with respect to 1512 of FIG. 15. Method 1700 then returns.

Thus, if a cylinder is cut out, or stops functioning, the crankshaft acceleration contribution from that cylinder will be less than the rest of the contributing cylinders. For a V12, four stroke engine, each cylinder fires once every other revolution of the crankshaft. Therefore, each cylinder will have a specific acceleration contribution on the crankshaft. This specific acceleration can be identified in a half order spectral analysis of the crankshaft speed sensors. Similarly, if one cylinder starts to over-fuel for some reason, the contribution onto the crankshaft will once again be specific and thus identifiable in a spectral analysis of the crankshaft speed sensor.

Once the cylinder degradation is identified, the control system may take necessary adjustments to optimize engine performance, efficiency, and emissions compliance routines. If indicated, the control system may also cut all fueling to the degraded cylinder to help protect the engine of any further secondary degradation that may occur.

At low engine speeds, it is typical for healthy cylinders to misfire, as the injectors are at the low end of their operational range. This makes it difficult to detect a cut out cylinder using spectral analysis, as the power levels seen between a healthy engine and an engine with a cut out cylinder are overlapping and there is no clear separation that may be used to identify the cut out cylinder. The method described above with respect to FIG. 17 overcomes these obstacles by combining spectral analysis with a pop test. During a pop test, each cylinder is over-fueled in a specific order for a specific duration. A healthy cylinder being over-fueled will have a relatively high half order power level, while a cut out cylinder will have a relatively low half order power level. The control system may utilize this separation in power levels to determine health of the individual cylinders at low engine speeds. Once the control system determines there is a cylinder working at less than full health, it can then take specific action around that cylinder to either optimize performance of the engine given a compromised cylinder or cut fueling to that cylinder to help protect the engine from further degradation. For example, an engine controller system can take action to adjust EGR rates and valves accordingly to adequately compensate for a lack of an injector firing as intended. This adjustment could be made to help maintain emissions compliance to a certain degree even with a compromised system. The controller could also derate overall load or power on the engine to help mitigate progression of a degradation and allow the vehicle enough opportunity to limp back home.

The pop test spectral analysis approach described herein may also be used to drive different degrees of injector health over time. As an injector starts to degrade over time, the impact on the half order or frequency content in the exhaust pressure system will start to drift and gradually increase. A threshold based approach may be taken to drive proactive maintenance, etc.

Further, such an approach may reduce the time and fuel costs associated with traditional cylinder health analyses. For example, traditional approaches may use approximately 10.950 Kg/Hr fuel (typically 10 GHP, 325 RPM-350 RPM) each time. And this data is for normal operation and for the over-fueling case, the injection quantity is increased. Further, traditional tests may have a duration of around 4-10 minutes. By using power spectral values of half order Goertzel algorithm run on the crank shaft wheel tooth data during the pop test mode or any other over-fueling mode, accurate power values of cylinder healthy operation may be analyzed instead of hearing the audible pop sounds. Power spectral values of half order components of crank shaft harmonic torsions are sensitive to injection quantity levels. Thus, reduced injection quantity may be used relative to the traditional tests described above, such as over-fueling for less duration per cylinder, which will reduce the fuel consumption.

By doing so, cylinder health information may be visually viewed on a display instead of hearing manually. Half order power spectral signatures may show sufficient sensitive behavior, thereby differentiating the cylinder health factors. Another advantage is usage of less fuel compared to conventional tests, as the power spectral sensitivity is high. As this method consumes less time, it may be initiated automatically, during the release conditions which are met for at least 1 to 1.5 minutes. Weak cylinder detection algorithms may get robustness by using this cylinder pop mode information using power spectral analysis and approximately more than 3-4 times reduction in fuel consumption may be realized. Each cylinder pop test, cylinder power levels may be stored in non-volatile memory to analyze the response of the fuel consumption in terms of torsional power for future reference.

In an embodiment, a system includes an engine having a plurality of cylinders coupled to a crankshaft, a crankshaft speed sensor, and a controller. The controller may be configured to receive output from the crankshaft speed sensor, differentiate a single-cylinder misfire event from a multi-cylinder misfire event based on the output from the crankshaft speed sensor, and adjust one or more engine operating parameters responsive to an indication of a single-cylinder misfire event differently from a multi-cylinder misfire event. In an embodiment of a related method, the method includes generating a signal with a crankshaft speed sensor; the signal is indicative of a speed of a crankshaft of an engine having a plurality of cylinders. The method further includes, with a controller, receiving the signal (e.g., sampling the signal), differentiating a single-cylinder misfire event from a multi-cylinder misfire event based on the output from the crankshaft speed sensor, and adjusting one or more engine operating parameters responsive to an indication of the single-cylinder misfire event differently from the multi-cylinder misfire event.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an engine having a plurality of cylinders coupled to a crankshaft;
a crankshaft speed sensor; and
a controller configured to:
receive an output from the crankshaft speed sensor, the received output from the crankshaft speed sensor sampled by the controller to obtain a sampled output;
process the sampled output to obtain a half order frequency signal and a first order frequency signal of the sampled output;
determine an amplitude of the half order frequency signal and an amplitude the first order frequency signal;
identify a cylinder misfire event, the cylinder misfire event being a single-cylinder misfire event where only one cylinder is misfiring or a multi-cylinder misfire event where more than one cylinder is misfiring;
differentiate the cylinder misfire event being the single-cylinder misfire event from the cylinder misfire event being the multi-cylinder misfire event based on the amplitude of the half order frequency signal and the amplitude of the first order frequency signal; and
adjust one or more engine operating parameters responsive to an indication of the single-cylinder misfire event differently from the multi-cylinder misfire event.

2. The system of claim 1, wherein the plurality of cylinders is arranged into a first cylinder bank and a second cylinder bank, and wherein to differentiate the single-cylinder misfire event from the multi-cylinder misfire event, the controller is configured to indicate the single-cylinder misfire event responsive to the amplitude of the half order frequency signal being greater than a first threshold amplitude but less than a second threshold amplitude and further responsive to an exhaust gas temperature of the first cylinder bank being within a threshold range of an exhaust gas temperature of the second cylinder bank.

3. The system of claim 2, wherein the controller is configured to indicate a first multi-cylinder misfire event responsive to the amplitude of the half order frequency signal being greater than the first threshold amplitude but less than the second threshold amplitude and further responsive to the exhaust gas temperature of the first cylinder bank being out of the threshold range of the exhaust gas temperature of the second cylinder bank.

4. The system of claim 3, wherein the controller is configured to indicate a second multi-cylinder misfire event responsive to the amplitude of the half order frequency signal being greater than the second threshold amplitude.

5. The system of claim 4, wherein the controller is configured to indicate a third multi-cylinder misfire event responsive to the amplitude of the half order frequency signal being less than the first threshold amplitude and further responsive to the amplitude of the first order frequency signal being greater than the first threshold amplitude.

6. The system of claim 5, wherein the controller is configured to indicate a fourth multi-cylinder misfire event responsive to both the amplitude of the half order frequency signal and the amplitude of the first order frequency signal being within a threshold range of the first threshold amplitude.

7. The system of claim 1, wherein the controller is configured to, responsive to indicating the single-cylinder misfire event, identify which cylinder is misfiring based on a phase of a selected frequency component signal of the output from the crankshaft speed sensor.

8. The system of claim 1, wherein the controller is configured to perform a cylinder identification test responsive to indicating the multi-cylinder misfire event, the cylinder identification test including:
while the engine is operating at a speed below a threshold speed, sequentially increasing an amount of fuel supplied to each cylinder;
determining an amplitude of a half order frequency signal for each cylinder while that cylinder is receiving the increased amount of fuel; and
indicating a given cylinder is misfiring responsive to the amplitude for that cylinder being less than a misfire threshold amplitude.

9. The system of claim 1, wherein the controller is configured to adjust one or more engine operating parameters by adjusting a fuel injection amount to a misfiring cylinder.

10. A vehicle comprising:
a chassis; and
the system of claim 1 attached to the chassis.

11. The vehicle of claim 10, further comprising an alternator and at least one electric motor, the crankshaft coupled to the alternator for driving the alternator to generate electricity, and the alternator coupled to the at least one electric motor to power the at least one electric motor with the electricity for moving the vehicle.

12. A method for an engine comprising a plurality of cylinders arranged into a first cylinder bank and a second cylinder bank, the method comprising:
detecting a cylinder misfire event responsive to a first magnitude of a half-order frequency component of a signal output from a crankshaft speed sensor being within a misfire threshold range of magnitudes;
if an exhaust temperature of the first cylinder bank is within a threshold range of an exhaust temperature of the second cylinder bank, indicating that the cylinder misfire event is a single-cylinder misfire event;
if the exhaust temperature of the first cylinder bank is not within the threshold range of the exhaust temperature of the second cylinder bank, indicating that the cylinder misfire event is a multi-cylinder misfire event; and
adjusting one or more operating parameters responsive to detecting the cylinder misfire event.

13. The method of claim 12, wherein detecting the cylinder misfire event comprises detecting the cylinder misfire event during maximum engine load conditions.

14. The method of claim 13, further comprising detecting a cylinder misfire event during low engine load conditions while the engine is operating at a speed below a threshold speed by:
sequentially increasing an amount of fuel supplied to each cylinder;
for each cylinder, while that cylinder is receiving the increased amount of fuel, determining a second magnitude of a half order frequency component of the signal output by the crankshaft speed sensor; and
indicating a given cylinder is misfiring responsive to the second magnitude for that cylinder being less than a misfire threshold magnitude.

15. The method of claim 14, further comprising determining a change in performance of a given cylinder based on a rate of change of the second magnitude for that cylinder over a duration.

16. The method of claim 12, wherein detecting the cylinder misfire event, indicating that the cylinder misfire event is the single-cylinder misfire event, indicating that the cylinder misfire event is the multi-cylinder misfire event, and adjusting the one or more operating parameters are carried out by a controller having one or more processors, the controller communicatively coupled with the crankshaft speed sensor.

17. The method of claim 16, wherein the engine and controller are operatively disposed in a vehicle.

18. A system, comprising:
an engine having a plurality of cylinders arranged into a first cylinder bank and a second cylinder bank, each cylinder coupled to a crankshaft;
a crankshaft speed sensor;
a first exhaust temperature sensor positioned to measure an exhaust temperature of the first cylinder bank;
a second exhaust temperature sensor positioned to measure an exhaust temperature of the second cylinder bank; and
a controller configured to:
differentiate a single-cylinder misfire event from a multi-cylinder misfire event based on frequency content of a signal output by the crankshaft speed sensor, the exhaust temperature of the first cylinder bank, and the exhaust temperature of the second cylinder bank; and
adjust one or more engine operating parameters responsive to an indication of a single-cylinder misfire event or an indication of a multi-cylinder misfire event.

19. A vehicle comprising:
a chassis; and
the system of claim 18 attached to the chassis.

* * * * *